(12) United States Patent
Bahmanyar et al.

(10) Patent No.: US 12,502,137 B2
(45) Date of Patent: Dec. 23, 2025

(54) IMPLANTABLE CARDIOVASCULAR SENSOR

(71) Applicant: IP2IPO INNOVATIONS LIMITED, London (GB)

(72) Inventors: Mohammad Reza Bahmanyar, London (GB); Christopher Neil McLeod, Headington (GB)

(73) Assignee: IP2IPO INNOVATIONS LIMITED, London (GB)

( * ) Notice: Subject to any disclaimer, the term of this patent is extended or adjusted under 35 U.S.C. 154(b) by 418 days.

(21) Appl. No.: 16/971,129

(22) PCT Filed: Feb. 20, 2019

(86) PCT No.: PCT/GB2019/050474
§ 371 (c)(1),
(2) Date: Aug. 19, 2020

(87) PCT Pub. No.: WO2019/162672
PCT Pub. Date: Aug. 29, 2019

(65) Prior Publication Data
US 2021/0100513 A1  Apr. 8, 2021

(30) Foreign Application Priority Data

Feb. 20, 2018 (GB) ...................... 1802740
Feb. 21, 2018 (GB) ...................... 1802820
Feb. 21, 2018 (GB) ...................... 1802824

(51) Int. Cl.
*A61B 5/00* (2006.01)
*A61B 5/0215* (2006.01)

(52) U.S. Cl.
CPC .......... *A61B 5/6869* (2013.01); *A61B 5/0215* (2013.01); *A61B 2562/0204* (2013.01); *A61B 2562/0247* (2013.01); *A61B 2562/164* (2013.01)

(58) Field of Classification Search
CPC ............... A61B 5/6869; A61B 5/0215; A61B 2562/0204; A61B 2562/0247; A61B 2562/164; A61B 2562/168
See application file for complete search history.

(56) References Cited

U.S. PATENT DOCUMENTS 5,212,988 A    5/1993  White
2005/0065589 A1  3/2005  Schneider et al.
(Continued)

FOREIGN PATENT DOCUMENTS

CN    101620018 B   10/2010
EP      1837638 A1    9/2007
(Continued)

OTHER PUBLICATIONS

International Search Report and Written Opinion for Patent Appl. No. PCT/GB2019/050474, dated May 20, 2019, 13 Pages.
(Continued)

*Primary Examiner* — Tse W Chen
*Assistant Examiner* — Evelyn Grace Park
(74) *Attorney, Agent, or Firm* — Maine Cernota & Curran

(57) ABSTRACT

An implantable cardiovascular pressure sensor comprising a rigid enclosure sealed by a flexible membrane; and an elongate compliant member comprising a piezoelectric material, the member having a width and a length greater than the width, and two ends separated by the length and two sides separated by the width; wherein the flexible membrane is coupled to the elongate compliant member to transfer external fluid pressure load to the elongate compliant mem-
(Continued)

Cross-section along line A-A ber to cause deflection of the elongate compliant member in response to changes in the external fluid pressure; the pressure sensor further comprising a first acoustic wave device provided by the piezoelectric material of the elongate compliant member for sensing said deflection.

17 Claims, 12 Drawing Sheets

(56) References Cited

U.S. PATENT DOCUMENTS

| | | | |
|---|---|---|---|
| 2005/0288596 | A1 | 12/2005 | Eigler et al. |
| 2007/0032734 | A1 | 2/2007 | Najafi et al. |
| 2007/0267708 | A1 | 11/2007 | Courcimault |
| 2010/0317977 | A1 | 12/2010 | Piaget |
| 2011/0036173 | A1* | 2/2011 | Chommeloux .... A61B 5/02152 73/702 |
| 2012/0123284 | A1 | 5/2012 | Kharadvar |
| 2014/0275830 | A1* | 9/2014 | Osorio ................ A61B 5/0031 600/301 |
| 2016/0000344 | A1* | 1/2016 | Cao ........................ A61B 3/16 600/587 |
| 2019/0006577 | A1* | 1/2019 | Ghyselen ................ H03H 3/08 |

FOREIGN PATENT DOCUMENTS

| | | | | |
|---|---|---|---|---|
| GB | 2552555 A | * | 1/2018 | ........... B81B 3/0018 |
| GB | 2558708 A | | 7/2018 | |
| GB | 2558730 A | | 7/2018 | |
| JP | 20070256287 A | | 10/2007 | |
| WO | 20060056857 A1 | | 6/2006 | |
| WO | 20160028583 A1 | | 2/2016 | |
| WO | 20160178196 A2 | | 11/2016 | |
| WO | 2018055367 A2 | | 3/2018 | |
| WO | 2018083486 A1 | | 5/2018 | |

OTHER PUBLICATIONS

International Search Report and Written Opinion for Patent Appl. No. PCT/GB2019/050538, dated Jul. 30, 2019, 18 Pages.
Search Report for Great Britain Patent Appl. No. 1802824.1, dated Aug. 22, 2018, 4 Pages.
Office Action for U.S. Appl. No. 28/042,254 mail date Jan. 18, 2024, 24 pages.
Notice of Allowance for U.S. Appl. No. 17/042,254 mail date Jul. 24, 2024, 12 pages.
Notice of Allowance for U.S. Appl. No. 17/042,254 mail date Aug. 16, 2024, 7 pages.

* cited by examiner

Fig. 1                      Plan view

Cross-section along line B-B

Cross-section along line C-C

Plan view (transparent)

Cross-section along D - D

IMPLANTABLE CARDIOVASCULAR SENSOR

RELATED APPLICATIONS

This application is a national phase application filed under 35 USC § 371 of PCT Application No. PCT/GB2019/050474 with an International filing date of 20 Feb. 2019 which claims priority of GB Patent Application 1802740.9 filed 20 Feb. 2018, GB Patent Application 1802820.9 filed 21 Feb. 2018, and GB Patent Application 1802824.1, filed 21 Feb. 2018. Each of these applications is herein incorporated by reference in their entirety for all purposes.

FIELD

The present disclosure relates to implantable devices. In particular, the present disclosure relates to implantable devices for sensing intravascular pressure.

BACKGROUND

It is desirable to provide a means for long-term clinical monitoring of patients—for example a patient's intravascular fluid pressure—that avoids the need for repeated use of invasive measurements, which can be uncomfortable for a patient and can affect a patient's health. One way of addressing this concern is by using implantable devices, which can be implanted intravascularly and can function to allow numerous measurements to be taken over a period of time without causing the patient discomfort, and indeed risk to the patient, each time a measurement is required to be taken.

Such an implantable device will however require suitable means by which to monitor intravascular fluid pressure accurately and repeatedly, while keeping the size of the device sufficiently compact to make it suitable for use intravascularly (or, indeed, elsewhere in a human or animal body).

International application no. PCT/GB2017/053313 discloses an implantable device for sensing intravascular pressure comprising a bulk acoustic wave resonator and an acoustic reflector.

International application no. PCT/GB2017/052802 discloses an implantable intravascular pressure sensor comprising a first transducer, a second transducer and an antenna coupling for sending and receiving signals.

SUMMARY

Aspects of the invention are as set out in the independent claims and optional features are set out in the dependent claims. Aspects of the invention may be provided in conjunction with each other and features of one aspect may be applied to other aspects.

In an aspect, there is provided an implantable cardiovascular pressure sensor comprising: (i) a rigid enclosure arranged for holding a compressible fluid or a vacuum sealed in the rigid enclosure by a flexible membrane; and (ii) an elongate compliant member. The elongate compliant member comprises a piezoelectric material. The member has a width and a length, wherein the length is greater than the width. The member has two ends separated by the length and two sides separated by the width. The flexible membrane is coupled to the elongate compliant member to transfer external fluid pressure load to the elongate compliant member to cause deflection of the elongate compliant member. The pressure sensor further comprises a first acoustic wave device provided by the piezoelectric material of the elongate compliant member for sensing deflection of the elongate compliant member.

The two ends may be supported within the rigid enclosure. The flexible membrane may be coupled to the elongate compliant member so that deflection of the elongate compliant member varies the internal volume of the enclosure. The sensor may be arranged to determine pressure based on a deflection (e.g. a deformation, such as bending) of the elongate compliant member. The pressure exerted on the sensor by fluid surrounding may thus be determined. For example, in the event that the sensor is implanted in a lumen (e.g. a vascular lumen), it may be possible to work out a pressure in the lumen (e.g. a blood pressure of a human or animal) based on deflection of the elongate compliant member.

To achieve this, the sensor may be arranged so that a change in the external pressure exerted on the membrane causes a change in the deflection of the elongate compliant member. For example, the underside of the membrane may be coupled to the elongate compliant member, for example it may lie against it and may be adhered to it. The membrane may include at least one flexible feature arranged to reduce rigidity in the membrane. For example, such a flexible feature may include a corrugation of the membrane arranged to reduce strain placed on the membrane by deformation. For example, the corrugation may comprise ridges (such as folds or bends) in the surface of the membrane. These may follow a closed path (which may be curved in places) that circumscribes the elongate compliant member about the surface of the sensor.

The flexible membrane may be provided by a compliant region of an enclosure such as that described with reference to at least one of: FIG. 12 or manufactured as described with reference to FIG. 12 .

A deflection (or a change in deflection) of the elongate compliant member may induce a change in the stress and/or strain in the piezoelectric material of the elongate compliant member. Measurable properties of the first acoustic wave device may change in response to a change in the deflection (i.e. a change in the stress and/or strain) of the elongate compliant member. Examples of such measurable properties may include its response to excitatory electrical signals, for example the resonant frequency or delay of that response. The sensor may be arranged so that a resonant frequency may be determined based on a response signal which is transmitted from the sensor in response to excitation of the acoustic wave device by an excitation signal transmitted to the sensor. Based on a measurement of the resonant frequency, a pressure of the surrounding fluid may be determined. The compliant member may be supported so that it deflects as a beam.

Sensor circuitry may be disposed in the sensor, such as within the rigid enclosure, or embedded in a wall of the rigid enclosure. The sensor circuitry may be arranged to provide an alternating electrical signal to the first acoustic wave device. The sensor may be configured to communicate with remote electronic systems using electromagnetic waves. For example, the sensor may carry an antenna for coupling with an alternating electromagnetic field to provide the alternating electrical signal to the sensor circuitry. A body of the sensor may comprise at least one via arranged to connect the antenna to the sensor circuitry. The antenna may be in electrical communication with the sensor for transmission of electrical signals, such as electromagnetic (RF) signals; it may be attached to the sensor.

The sensor may be sized (or dimensioned) to fit within the artery of an animal or human body, for example the pulmonary artery. The sensor may be particularly suitable for use with an overweight adult human, for example an adult human male. Optionally, the sensor may be arranged to be fixed against the arterial wall, for example it may be mounted to an anchoring apparatus that is arranged to hold it against the wall of the artery, for example the front wall. The anchoring apparatus may comprise nitinol wire and/or a bio-absorbable material, which allows it to be absorbed into the tissue of a body (e.g. an "endothelialised device" when deployed in an artery, for example. Such an anchoring apparatus is described in UK Patent Application No. 1616092.1.

A key implementation of the present pressure sensor is for use as an implantable cardiovascular pressure sensor. This implantable sensor may be arranged (e.g. sized) so that it can be implanted in the CV system—e.g. in the chambers or walls of the heart or in the vasculature, such as the pulmonary artery. The sensor may be adapted for implantation in mammals. For example, it may be adapted for implantation in mammals which are cat-sized or larger, and/or for implantation in mammals which are horse-sized or smaller. For example, such mammals may include: humans (such as adult humans, for example adult human males), cats, dogs, horses etc.

Such a pressure sensor may be suitable for use as an implantable cardiovascular sensor by adhering to certain constraints. As one example, the pressure sensor may be sized to be within a suitable range for implantation, such as the total length of the sensor being less than 12 mm; for example less than 10 mm. It is to be appreciated that these dimensions may vary depending on the nature of the mammal into which the sensor is implanted—for example, a larger pressure sensor may be implanted into a horse than one implanted into a cat.

The implantable cardiovascular pressure may be approximately 2 mm in width, for example less than 2.5 mm; for example less than 2 mm; for example less than 1.5 mm. The sensor may be approximately 10 mm in length, for example less than 12 mm; for example less than 10 mm; for example less than 8 mm. At this size, the sensor may be suitable for implanting in a mammal such as a human. If the sensor is larger than this, it may be hard to implant into a subject as the sensor may have a substantial degree of axial rigidity. As such, implantation of the sensor into, or via, a tortuous passage may not be possible. For example, when trying to feed the sensor into a subject via a catheter and a series of blood vessels, the sensor may be too rigid to conform to the paths required to reach its destination.

The elongate compliant member may be selected to be between 4 mm and 10 mm in length. For example, the member may be greater than 4 mm; it may be greater than 5 mm; it may be less than 10 mm; it may be less than 9 mm; it may be less than 8 mm. The member may be less than 2 mm wide; it may be less than 1.5 mm; it may be less than 1.2 mm; it may be less than 1 mm; it may be less than 0.8 mm. The member may be approximately 50 microns thick. For example, it may be less than 60 microns; it may be less than 55 microns; it may be less than 50 microns.

In situ in an adult human, e.g. in a blood vessel, the sensor may be subject to pressures in the region of approximately 0.1 to 0.25 Bar. The sensor may be arranged to provide a resolution of pressure measurement in the region of 1 mbar. This may enable the pressure sensor to be configured (e.g. sized and shaped) to be suitable for implantation in a cardiovascular system whilst still being able to provide meaningful pressure measurements. For example, the pressure sensor may be arranged to have a resolution of less than 5 mbar; for example less than 4 mbar; for example less than 3 mbar; for example less than 2 mbar; for example less than 1 mbar. However, it is to be appreciated that the resolution of the sensor may be selected based on the desired location of implantation. For example, when implanted in the pulmonary artery of an adult human being, a resolution of more than 3 mbar may be inadequate, whereas when implanted in the left ventricle of an adult human being, a resolution of 3 mbar may be satisfactory. The dimensions of the sensor (e.g. the member) may be selected to provide a selected resolution for pressure measurements.

The elongate compliant member being supported at two ends may comprise the member being rigidly fixed at two ends, wherein said two ends are opposite one another. The elongate compliant member being supported at two ends may comprise the member being bonded at two ends (e.g. to a base in the rigid enclosure), wherein said two ends are opposite one another. The two ends are separated from each other by a length to form a largely rectangular piece of material. The elongate compliant member comprises two ends and two sides. The length of the rectangle is substantially greater than its width. For example, the length of the elongate compliant member may be at least 1.1 times greater than the width of the elongate compliant member; the length may be at least 1.2 times greater than the width; the length may be at least 1.3 times greater than the width; the length may be at least 1.4 times greater than the width; the length may be at least 1.5 times greater than the width; the length may be at least 2 times greater than the width; the length may be at least 5 times greater than the width; the length may be at least 10 times greater than the width.

The rigid enclosure may include a cavity of compressible fluid at a (known) reference pressure, including low pressures such as a vacuum which may be close to a perfect vacuum. The sensor may be arranged so that the first acoustic wave device and the flexible membrane can be deflected into (or away from) the cavity in response to changes in intravascular pressure. The sensor is arranged so that deflection of the elongate compliant member and/or the flexible membrane varies the internal volume of the enclosure. The compressible fluid may be held within the internal volume of the enclosure. The flexible membrane may be coupled to the elongate compliant member so that deflection of the membrane causes deflection of the member. For example, the flexible membrane may be in direct contact and or fixed to the elongate compliant member. The coupling between the elongate compliant member and the flexible member may be arranged to transfer pressure load on the flexible member into deflection of the compliant member (e.g. as efficiently as possible).

The rigid enclosure may be hermetically sealed by the flexible membrane. Hermetic sealing comprises an 'air-tight seal', i.e. where the number of particles sealed within the enclosure remains practically constant. The volume (and pressure) of fluid within the rigid enclosure may change in response to movement of the compliant member and/or the flexible membrane. In response to an external pressure load the flexible membrane may transfer pressure to the elongate compliant member. This may provide a deflection which in turn varies the volume and pressure of fluid inside the rigid enclosure. However, it is to be appreciated that no change in volume may occur, or at least the change in volume may be negligible compared to the overall volume inside the rigid enclosure. For example, the volume of the enclosure may be selected so that any change in volume in response to deflection of the member is negligible in comparison to the overall volume. Arrangements may provide for increased sensitivity where a counterforce due to increased pressure in the enclosure is reduced. A cavity may be defined, which is formed by interior walls of the rigid enclosure and the flexible membrane. The flexible membrane may be integrated with the elongate compliant member.

Supporting (e.g. rigidly fixing) the elongate compliant member to the rigid enclosure at two ends, but leaving it flexibly connected to the rigid enclosure (i.e. via the flexible membrane) along the two sides may enable a higher proportion of the total strain to be induced in the principal direction (i.e. along the length of the elongate compliant member). It may also enable a reduction in the strain induced in a direction perpendicular to the desired principal direction. This may enable increased measurement sensitivity for measuring pressure. For example, this is because, for a given pressure load, the frequency shift may be reduced due to the perpendicular strain for the piezoelectric material. Thus, a bigger shift may occur which in turn may provide an easier to measure benefit. Elongation of the compliant member may also enable increased sensitivity for measuring pressure of the surrounding fluid.

The sides of the elongate compliant member may be coupled to the rigid enclosure by the flexible membrane. For example, the sides of the elongate compliant member may not be rigidly fixed to the rigid enclosure. The sides may be deflected or displaced relative to corresponding sections of the walls of the rigid enclosure. For example, deflection of the sides relative to corresponding walls of the rigid enclosure may occur in response to pressure exerted on the sensor by its surroundings. The ends of the elongate compliant member may be arranged so that in response to changes in pressure exerted on the sensor, little (or no) displacement of the ends of the member occurs relative to the walls of the rigid enclosure. For example, where the compliant member is not rigidly fixed to the enclosure/base (e.g. where it is simply supported/bonded), the member may be supported so that in response to a pressure change, the member undergoes a sufficient deflection for the first acoustic wave device to determine a pressure of the fluid surrounding the sensor.

The sensor may be arranged so that the first acoustic device is hermetically sealed from fluid surrounding the sensor. The flexible membrane may hermetically seal the first acoustic device from fluid surrounding the sensor. The hermetic seal of the acoustic device may be transparent to pressure. For example, the hermetic seal may enable efficient transfer of pressure external to the sensor to the pressure sensor. For example, the hermetic seal for the pressure sensor is arranged to enable most of the pressure load to be transferred to the pressure sensor.

The first acoustic wave device may comprise a surface acoustic wave ('SAW') device. The SAW device may be disposed on an internal face of the elongate compliant member. The SAW device may comprise an interdigitated transducer having a plurality of interdigitated fingers spaced apart in the direction of the length of the compliant member. Based on known data (i.e. for normalising measurement values from the acoustic device), it may be possible to determine a pressure of fluid surrounding the sensor. For example, data from one acoustic device may be compared to data stored in a look-up table to determine the pressure.

The size of the pressure sensor, and the arrangement of the first acoustic wave device, may be selected based on a frequency of incoming radiation for exciting the first acoustic wave device. For example, it may be arranged to receive radiation in an ultra high frequency ('UHF') band. For example this may be in the region of 300 MHz to 3 GHz; for example at a frequency greater than 500 MHz; for example greater than 600 MHz; for example greater than 700 MHz; for example greater than 800 MHz; for example at around 800 to 900 MHz. At such frequencies, the first acoustic wave device (e.g. a resonator of the first acoustic wave device) may be arranged so that it is around 1.4 to 1.6 mm in length. For example, it may be less than 2 mm in length; for example less than 1.8 mm; for example less than 1.6 mm; for example less than 1.5 mm.

Selecting the size or arrangement of an acoustic wave device may comprise selecting the number of interdigitated fingers. The number of fingers may be selected based on a desired coupling coefficient. The spacing between the fingers may be selected to control the frequency response of the acoustic wave device. The length of the acoustic wave device may be selected based on the coupling with the antenna. The sensor is arranged to be excited in response to signals in the region of approximately 800 to 900 MHz. This may enable the acoustic wave device to be in the region of 1.4 to 1.6 mm in length. This may then be included in a pressure sensor of total length less than 10 mm so that it may be suitable for implanting into a cardiovascular system of an adult human. Providing an excitatory response to higher frequencies (and thus smaller wavelengths) may enable the sensor to be smaller in size, as an antenna (such as a quarter wave antenna) will have a size which is selected based on the wavelength of the radiation it is receiving/transmitting.

It may be preferable to provide the first acoustic wave device in a region of the member in which distribution of stress is reasonably uniform. Typically, this may occur in regions towards the centre of the member, i.e. located away from regions where the member is connected to the rigid enclosure. In examples where the member is rigidly fixed to the rigid enclosure, the first acoustic wave device may be located in a central third of the member, so as to provide the device in a region of the member with a satisfactory degree of uniformity. Of course, it is to be appreciated that this may be dependent on the dimensions of the member and the pressure conditions under which it is operating. In examples where the member is simply supported by (e.g. lightly bonded to) the rigid enclosure, stress distribution in the member may be more uniform along the entire length of the member. In these examples, the first acoustic wave device may be located at any suitable location along the length of the member.

A wall of the rigid enclosure may comprise piezoelectric material and the sensor may comprise a second acoustic wave device provided by the wall. The second acoustic wave device may be disposed on an internal surface of the rigid enclosure. A base may be provided which comprises piezoelectric material and the sensor may comprise a second acoustic wave device provided by the base. The base may be part of the rigid enclosure; the base may be attached to the rigid enclosure; the base may comprise the wall of the rigid enclosure which provides the second acoustic wave device. The elongate compliant member and the rigid wall may comprise the same piezoelectric material. This may facilitate simpler comparisons between measurements from the two acoustic devices. Attachment means for attaching the base to the rigid enclosure may be selected to inhibit dispersal of acoustic waves from the base to the rigid enclosure. The two ends may be rigidly fixed to a base within the rigid enclosure.

The flexible membrane may be configured to withstand intravascular pressures, and may be arranged to provide a hermetic seal for the enclosure for all standard operating pressures. The flexible membrane may be arranged (i.e. shaped and sized) to allow for expansion and contraction (e.g. in response to changes in pressure), and to maintain a hermetic seal for the internal volume of the enclosure, as defined by an interior surface of a rigid wall of the enclosure and the membrane. The flexible membrane may comprise strain relief features, for example the membrane may be arranged to provide bellows which move as the membrane is displaced, for example it may be corrugated. The corrugation may comprise at least one ridge or groove. The corrugation may comprise a corrugated region of the flexible membrane. The membrane may comprise a biocompatible metal such as gold. The membrane may comprise a diaphragm, which may be corrugated.

The membrane may comprise a layered polymer structure. The layered polymer structure may comprise a layer of polymer and a layer of a sealing material. The sensor may comprise a plurality of layers of the polymer and/or the sealing material provided in alternate layers of the membrane. The sealing material may comprise an inorganic material for example a glassy oxide. The layers may be provided by atomic layer deposition.

The acoustic wave device may comprise a bulk acoustic wave, BAW, device. The BAW device may comprise electrodes on the sides of the elongate compliant member for providing a voltage across its width. In operation, the sensor may be excited to resonate in response to the voltage being provided, wherein the voltage is applied through the electrodes. This may cause energy to be stored in the acoustic wave structure, such that if the voltage being applied is removed, the electrodes may then measure a response. The response will be based on the stored energy, and it may be used to provide the measurement signal at the electrodes, from which the pressure can be determined as described herein.

A rigid wall of the rigid enclosure may comprise piezoelectric material and the sensor may comprise a second bulk acoustic wave device provided by the rigid wall. For example, the rigid enclosure may comprise the base. For example, the base may comprise the rigid wall. The first surface acoustic wave device may comprise a first transducer arranged to provide a pressure dependent signal in response to alternating electrical signals of a first frequency band. The second surface acoustic wave device may comprise a second transducer arranged to provide a reference signal in response to alternating electrical signals of a second frequency band different from the first frequency band. The sensor may comprise an antenna coupling for sending and receiving said signals. Since each transducer is arranged to respond to electromagnetic signals in different frequency bands, each transducer can be individually interrogated by choosing the corresponding frequency band of an excitation signal transmitted to an antenna of the sensor.

The antenna coupling may be coupled to the first transducer and to the second transducer for coupling both transducers to the same antenna. A pressure dependence of the response signal provided by the first transducer may be associated with a pressure dependent change in a resonance characteristic of the first transducer. The second transducer may be arranged so that pressure dependent changes in the resonance characteristic of the second transducer are less than those of the first transducer. For example, the second transducer may be wholly or partially insensitive to pressure changes. Resonance characteristics, such as frequency shifts and timing delays, are easy to measure with a high degree of accuracy. By arranging the device so that the two transducers respond by a different amount to pressure changes, differences between the responses of the two transducers can be used to determine the pressure of fluid surrounding the sensor.

The first transducer and the second transducer may be electrically in parallel with each other. The two transducers may be tuned (have a frequency response) selected so that the two transducers can operate independently of one another. That is to say that the presence of the first transducer has very little effect on the operation of the second transducer when the system is provided with alternating electrical signals within the second frequency band, and vice versa.

The device may further include an antenna coupled to the antenna coupling, the antenna being adapted for sending and receiving signals described herein, for example wherein the alternating electrical signals comprise radio frequency (RF) signals. By providing the device with an antenna, the ability of the device to receive electromagnetic signals may be improved. The antenna may have a bandwidth which encompasses the first frequency band and second frequency band. This may allow the antenna to preferentially receive electromagnetic signals having frequencies corresponding to each of the first and second frequency bands. In addition, the pressure dependence of the response provided by the first transducer may be associated with deflection of the compliant member by changes in intravascular pressure. The reference response may be associated with a reference member (i.e. the base or the rigid wall of the enclosure), which is arranged to be deflected less than the compliant member by those same changes in intravascular pressure.

Determination of pressure changes by measuring deflections provides a convenient means of determining changes in pressure while minimising the need for active electrical components, or complex moving parts. The material providing the first surface acoustic wave device and the material providing the second acoustic wave device may comprise the same material. The material from which each is made may be crystalline. In particular, the material providing the first surface acoustic wave device and the material providing the second acoustic wave device may have the same crystal orientation, for example they may have the same crystal plane orientation. Comparison of readings between the two transducers may be simplified when they are associated with deflections of the same material. Similarly, ensuring that the crystal plane orientation of the reference and deflectable members is the same may help to simplify the comparison of the two readings. In particular, the temperature of the sensor may fluctuate during normal usage and in such events thermal expansion of the sensor (and its components) is likely to occur. In this case, use of comparable materials may facilitate easier processing of data received from the sensor. For example, ensuring that the reference and deflectable members are made from the same material, and even have the same crystal plane orientation, also aids in ensuring that the two members are affected equally by the thermally induced effects, and therefore comparisons between the pressure dependence of the two signals can help to account for thermal effects.

The sensor may be arranged to receive an alternating electrical signal suitable for providing electrical energy to the intravascular pressure sensor when implanted in a human or animal body. The implanted device could therefore be arranged to operate indefinitely, as there is no requirement for on-board energy sources.

In an aspect, there is provided an implantable cardiovascular pressure sensor comprising: an enclosure, having a wall comprising a compliant region, integral with the wall, and arranged to be displaced into or outward from the enclosure in response to changes in a pressure difference across the wall; and a deflectable piezoelectric member coupled to the compliant region to be deflected in response to displacement of the compliant region, and an acoustic wave transducer, wherein the deflectable piezoelectric member provides the substrate of the acoustic wave transducer.

The compliant region may comprise a flexible feature in the wall. The flexible feature may comprise at least one of a thinner part of the wall, and a corrugation in the wall. The flexible feature may provide a boundary between the compliant region and a less compliant region of the wall. The flexible feature may circumscribe the compliant region. The wall and the compliant region may be integrally formed from the same material. The wall and the compliant region may comprise a biocompatible metal, such as gold.

The sensor may comprise a second acoustic wave transducer, for example which is arranged to provide a reference for the first acoustic wave transducer. The sensor being arranged to provide a reference may comprise the second acoustic wave transducer being disposed on a piezoelectric substrate that is arranged to be deflected differently in response to the pressure difference than a substrate of the first acoustic wave transducer. For example, one of the acoustic wave transducers may be placed on a substrate of different rigidity (e.g. thickness), or placed on a region of the same substrate which responds more substantially to pressure being applied. For example, this may comprise the second acoustic wave transducer being disposed on a piezoelectric substrate that is deflected less by displacement of the compliant region than a substrate of the first acoustic wave transducer. A relationship may be known between the pressure responses of the two acoustic wave transducers so that a reference may be provided. The sensor being arranged to provide a reference comprises the second acoustic wave transducer being provided with the same substrate as the first acoustic wave transducer.

The deflectable piezoelectric member may be supported at at least one end, and it may have a length cantilevered from said support that is more than its width. The deflectable piezoelectric member may be a beam. The enclosure may comprise a deposited body, formed by deposition on a mandrel to provide the wall and compliant region. The wall may provide at least one side, for example four sides, of the enclosure. The enclosure may be closed by a dielectric end cap hermetically sealed to an end of the enclosure. The dielectric end cap may comprise a fixture for holding an antenna, for example wherein the sensor comprises an electrical connection between the fixture and the first acoustic wave transducer.

In an aspect, there is provided a method of forming an implantable cardiovascular pressure sensor. The method comprises: depositing a layer of material onto a mandrel comprising a forming feature arranged so that the layer provides a wall comprising a compliant region integral with the wall; detaching the wall from the mandrel to form an enclosure comprising said wall; coupling a deflection sensor to the compliant region, inside said enclosure, to sense deflection of the compliant region; and sealing said enclosure so that the compliant region can be displaced into or outward from the enclosure in response to changes in a pressure difference across the wall.

The deflection sensor may comprise a deflectable piezoelectric member operable to be deflected in response to displacement of the compliant region, and an acoustic wave transducer, wherein the deflectable piezoelectric member provides the substrate of the acoustic wave transducer. Depositing may comprise electroforming. The material may comprise a biocompatible metal such as gold. The material may further comprise a non-biocompatible material, such as nickel, which is plated with the biocompatible material. The mandrel may comprise a sacrificial mandrel.

FIGURES

Some embodiments will now be described, by way of example only, with reference to the FIGS. in which.

In the drawings like reference numerals are used to indicate like elements.

SPECIFIC DESCRIPTION

Figure 1:
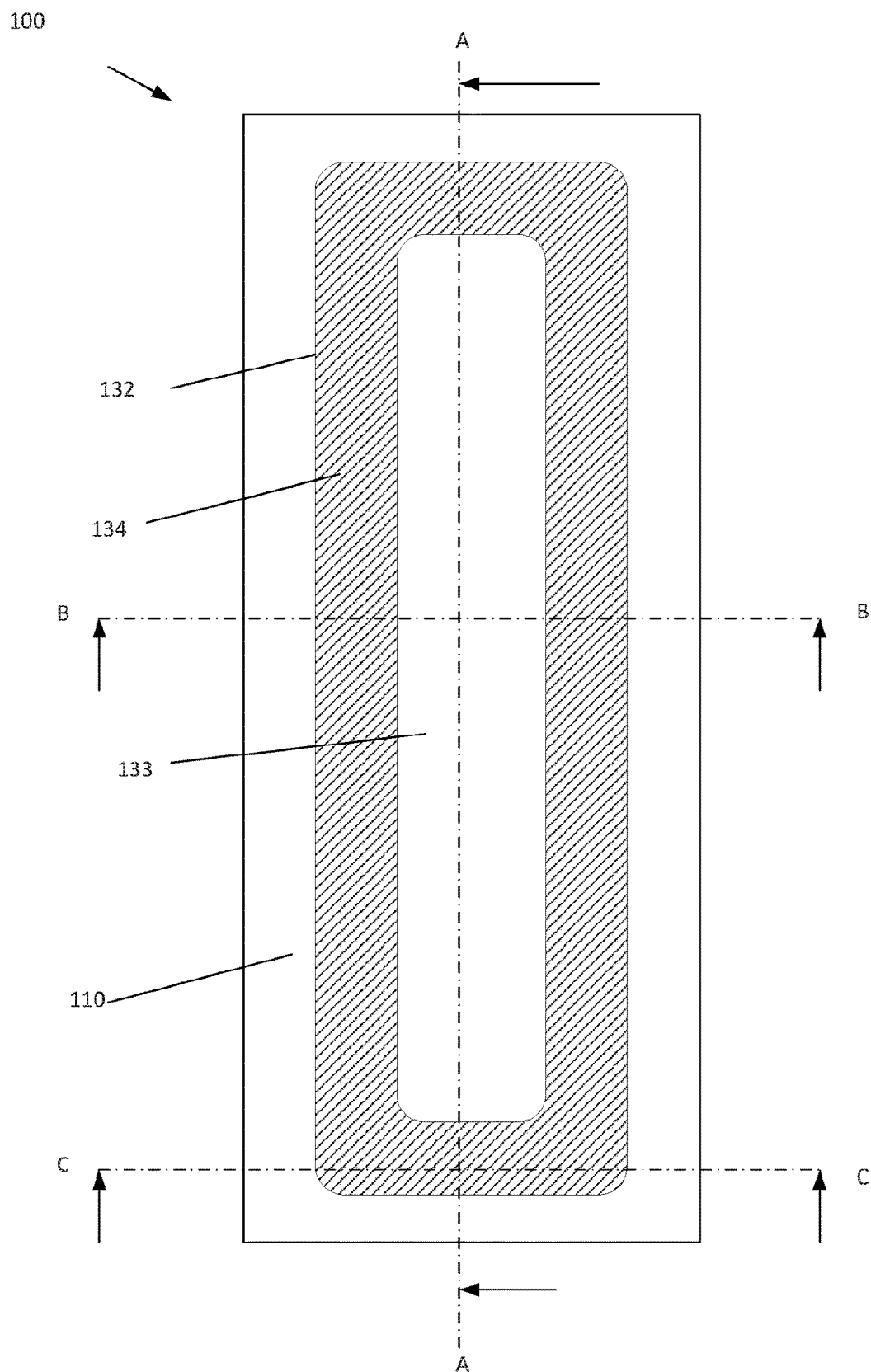
FIG. 1 is a schematic diagram illustrating a plan view of an implantable cardiovascular pressure sensor.
Figure 3:
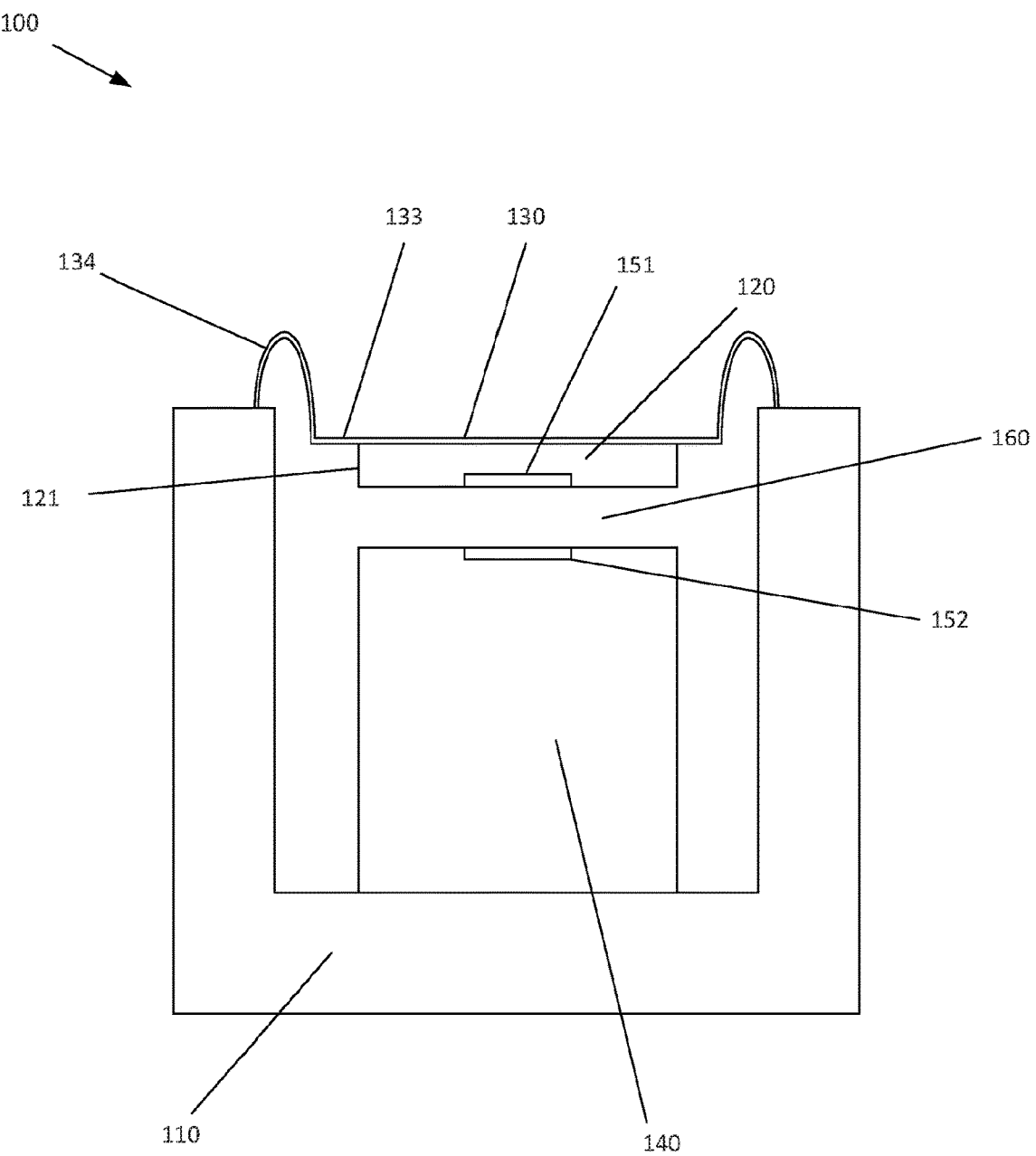
FIG. 3 is a cross-section taken along the line B-B illustrated in FIG. 1.
Figure 4:
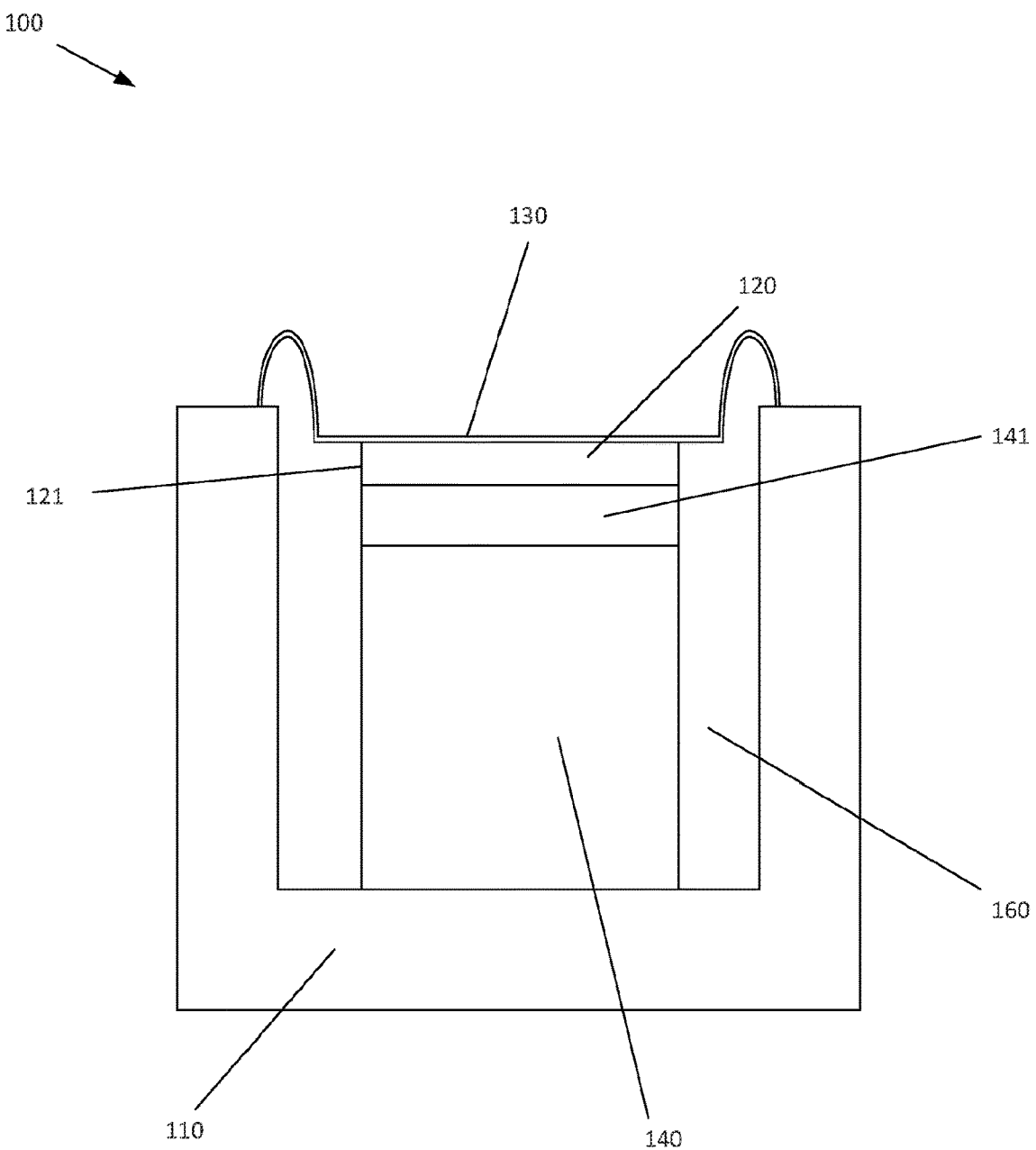
FIG. 4 is a cross-section taken along the line C-C illustrated in FIG. 1.
Figure 5:
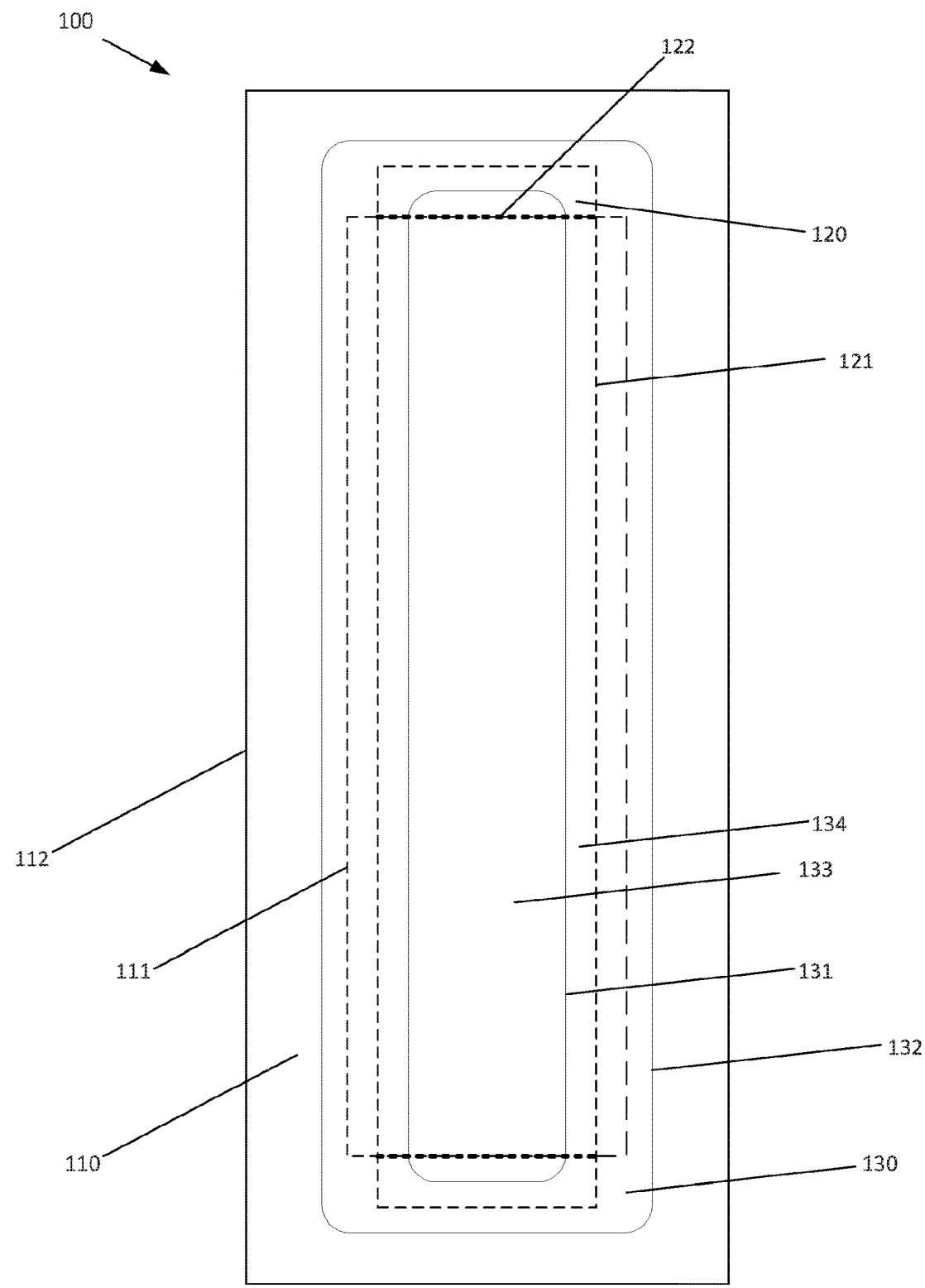
FIG. 5 is a schematic diagram of the plan view shown in FIG. 1 with hidden layers included (as viewed in plan) shown in dashed lines.

FIGS. 1 to 5 show different views of an implantable cardiovascular pressure sensor 100. FIG. 1 shows a plan view of the sensor 100, and FIGS. 2 to 4 each show a cross-sectional view taken along the lines A-A, B-B and C-C respectively, as illustrated in FIG. 1. The line A-A is a longitudinal axis of the sensor 100. The line B-B is perpendicular to the longitudinal axis in the middle of the sensor 100, and the line C-C is perpendicular to the longitudinal axis towards one end of the sensor 100. FIG. 5 shows the plan view of FIG. 1 with a certain degree of transparency, so that the dashed lines represent lines which would not be seen in plan, i.e. which form part of layers of the sensor 100 which are beneath the top layer.

The implantable sensor 100 will now be described with reference to FIGS. 1 to 5. The pressure sensor 100 comprises a rigid enclosure 110 and an elongate compliant member 120. The elongate compliant member 120 is rigidly fixed within the enclosure 110, and is coupled to a flexible membrane 130. The enclosure 110 is sealed by the flexible membrane 130 to define an internal volume 160, which holds a compressible fluid. The member 120 may bend in response to pressure being exerted on the pressure sensor 100. The extent of the bending of the member 120 is dependent on the pressure being exerted on the sensor 100. The member 120 includes a first acoustic wave device 151 on a surface of the member 120. The first acoustic wave device 151 provides measurements that are affected by the member 120 bending (e.g. using vibrations in the member 120). These measurements can thus be used to work out the pressure of fluid surrounding the pressure sensor 100.

The membrane 130 is coupled to the member 120. The membrane 130 also couples the member 120 to a wall of the rigid enclosure 110. Two ends 122 of the member 120 are rigidly fixed within the enclosure 110. The member 120 may bend within the enclosure (e.g. in response to pressure being exerted on the sensor 100). The enclosure 110 has a rigid wall having an interior surface 111 and an exterior surface 112. The interior surface 111 of the rigid enclosure 110 defines an internal volume 160 of the pressure sensor 100. The enclosure 110 is shaped so that one face of this volume 160 is 'open'. The open face is sealed by the membrane 130. The rigid wall of the enclosure 110 may comprise, or consist entirely of, ceramic.

Figure 2:
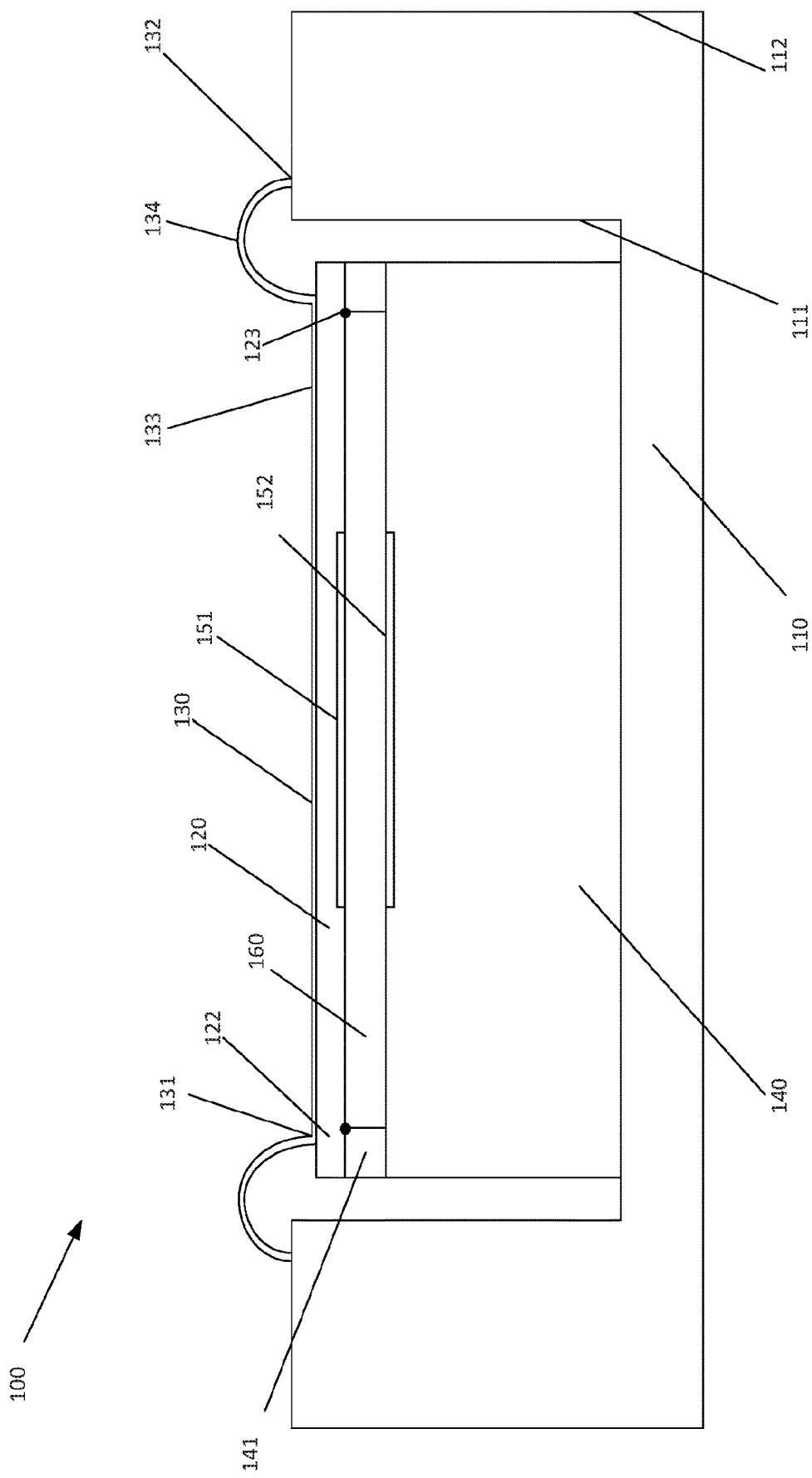
FIG. 2 is a cross-section taken along the line A-A illustrated in FIG. 1.

For clarity FIG. 2 is not to scale. However, it is to be appreciated the sensor 100 may be elongate. A length of the sensor 100 may therefore be longer than a width of the sensor 100. An acoustic wave device (e.g. a quartz surface acoustic wave beam sensor may have dimensions of 1×0.5×3 mm^3. A piezoelectric film may be used on a diamond substrate to provide a smaller device. The horizontal axis of FIG. 2 is a longitudinal axis of the pressure sensor 100. The sensor 100 may be substantially elongate along its longitudinal axis, which is indicated as line A-A in FIG. 1. The rigid enclosure 100, and the contents inside it, are arranged to hold a compressible fluid inside the internal volume 160. The compressible fluid is securely held within the internal volume 160 by the flexible membrane 130, which seals the enclosure 110. Although not shown, the rigid enclosure 100 may be arranged to hold a vacuum.

In FIGS. 2 to 4, a base 140 is illustrated inside the enclosure 110. The base 140 may be secured to the enclosure 110, i.e. to rigidly secure the member 120 in the enclosure 110. The base is illustrated with spacers 141 which provide a raised surface of the base 140 for attaching the member 120 to the base 140. The spacers may form a bond between the base 140 and the member 120, i.e. they may bond the member 120 to the base 140. The spacers may comprise gold. For example, the spacers may form a golden solder bond between the member 120 and the base 140. The attachment between the base 140 and the member 120 is arranged so that a layer of compressible fluid is provided between the base 140 and the member 120 (except at the attachment points). The base 140 is also illustrated as comprising a second acoustic wave device 152 on the exterior of one of its surfaces. The region of the base 140 which surrounds/provides the second acoustic wave sensor 152 comprises a piezoelectric material. For example, the whole base 140 may be formed of a piezoelectric material.

The compliant member 120 is rigidly attached to the spacers 141 of the base 140 at rigid attachment points 123 (denoted as black circles in FIG. 2). The compliant member 120 is elongate along the longitudinal axis A-A of the pressure sensor 100. The compliant member 120 may be cuboidal, for example it may be a beam. The region of the compliant member which surrounds/provides the first acoustic wave sensor 151 comprises a piezoelectric material. For example, the whole compliant member 120 may be formed of a piezoelectric material.

The compliant member 120 has a width and a length. The length of the compliant member 120 is along the longitudinal axis A-A of FIG. 1. The compliant member 120 has two ends 122, which are the regions of the member 120 at the left and at the right as illustrated in FIG. 2. Each of these ends 122 is rigidly fixed to the base 140. The rigid fixing may be via the rigid attachment points 123 at the respective ends 122 of the member 120.

The flexible membrane 130 is supported by the compliant member 120. The flexible membrane 130 couples the compliant member 120 to the rigid enclosure 110. The membrane 130 is attached to the rigid enclosure at a fixation point 132, which may extend around the perimeter of the enclosure 110. The compliant member 120 may be fixed to the flexible membrane 130, or it may be indirectly connected to the membrane 130, e.g. via another piece of material. As shown in FIG. 2, a central portion 133 of the membrane 130 is attached to the compliant member 120 between attachment points 131 where the two components are separate. The attachment points 131 may be towards the ends 122 (and/or sides) of the member 120; they may be at the ends 122/sides 121 of the member 120.

The flexible membrane 130 may be corrugated. As shown in FIGS. 2 to 4, the membrane 130 comprises a ridge 134 towards the ends/sides of the membrane 130. The ridge 134 may extend around the perimeter of the membrane 130 to provide a flexible connection between the compliant member 120 and the rigid enclosure 110. This may form a corrugation for relieving strain. Ridges in the membrane 130 may provide a dome shape around the perimeter of the membrane 130. For example, the ridge 134 may circumscribe the member 120 and the central portion 133 of the membrane 130, and the ridge 134 may rise in height from the membrane 130 as it extends radially outwards before attachment to the rigid enclosure 110. For example, the rigid enclosure 110 may have a higher elevation than the central portion 133 of the membrane 130, such that attachment between the membrane 130 and the rigid enclosure 110 is at a higher elevation than the elevation of the central portion 133 of the membrane 110. The ridge 134 may rise from the lower elevation of the central portion 133 of the membrane 130 to the rigid enclosure 110, and for example, a trajectory of this rise in elevation may have a dome shape when viewed in cross-section. The membrane 130 may comprise a bio compatible material. For example, gold can be used, as can layered polymer structures.

As shown in FIG. 1, the central portion 133 of the membrane is left blank whilst the ridge 134 is shaded so that the shape of the ridge around the perimeter of the membrane 130 can be seen. This shape is not to be construed as limiting. For example, as the member 120 is supported at its ends 122 by the enclosure 110, the membrane 130 may not have a ridge in that region, and instead a flat join between the membrane 130 and the enclosure 110 may be provided.

FIG. 3 shows a cross-section of the sensor 100 of FIG. 1 along the line B-B. The base 140 and the member 120 are connected at the ends 122 of the member 140. As this cross-section is taken towards the middle of the length of the device, there is no attachment between the member 120 and the base 140, and instead the two components are separated by a compressible fluid or a vacuum in the internal volume 160. The sides 121 of the member 120 are not rigidly connected to the enclosure 110. Rather, they are connected via the membrane 130, which provides a flexible connection and a hermetic seal for the internal volume 160. The central portion 133 of the membrane 130 is illustrated as being wider than the member 120, i.e. the ridge 134 begins at a width beyond the width of the member 120. However, it is to be appreciated that this is purely illustrative, and in fact the ridge 134 could begin at a width where the membrane 130 is fixed to the member 120.

FIG. 4 shows a cross-section of the sensor 100 of FIG. 1 along the line C-C. This cross-section is taken towards the end 122 of the member 120. In this region, the member 120 is connected to the base 140 via the spacer 141 of the base 140. As illustrated, either side of the base 140 is surrounded by compressible fluid (or vacuum) in the internal volume 160 of the enclosure 110. It is to be appreciated that this is not limiting, and the base 140 may be attached to the enclosure 110 so that no fluid surrounds the sides of the base. The fluid carrying capacity of the internal volume 160 may vary, for example depending on the specifics of the location which the sensor 100 is intended for, or the components provided in the internal volume 160.

FIG. 5 shows a plan view of the sensor 100 (as in FIG. 1), except dashed lines are used to represent lines beneath the surface. The compliant member 120 is substantially elongate and has two sides 121 which extend between the two ends 122 of the member 120. As illustrated, there is some room between the sides 121 of the member 120 and the interior surface 111 of the rigid enclosure 110. Unlike the ends 122, the sides 121 of the member 120 are not directly coupled to the enclosure 110. Rather, the membrane 130 provides a flexible bridge between the member 120 and the enclosure 110.

The sensor 100 is arranged so that the membrane 130 will be displaced relative to the rigid enclosure 110 (and thus the internal volume 160 will vary) based on pressure being exerted on the sensor 100 from fluid surrounding it. The membrane 130 may provide a hermetic seal for the enclosure 110, and the pressure of the compressed fluid held in the internal volume 160 varies based on movement of the membrane 130 relative to the enclosure 110. In response to a first pressure being exerted on the sensor 100, this pressure may be opposed (e.g. balanced out) by three counteracting forces. Firstly, there may be a reactive force from the elongate member 120 (e.g. in response to beam deflection of the member 120). Secondly, there may be a reactive force from the flexible membrane 130. Thirdly, there may be a reaction from any compressed fluid in the enclosure 110, although, where a vacuum is used instead of a compressed fluid, the third opposing force is likely to be reduced. Likewise, where there is sufficient flexibility in the membrane 130, reactive forces from the membrane 130 may be reduced. Therefore, the external pressure load may be counteracted (opposed) predominantly by the member 120, i.e. to induce a greater deflection.

Figure 6:
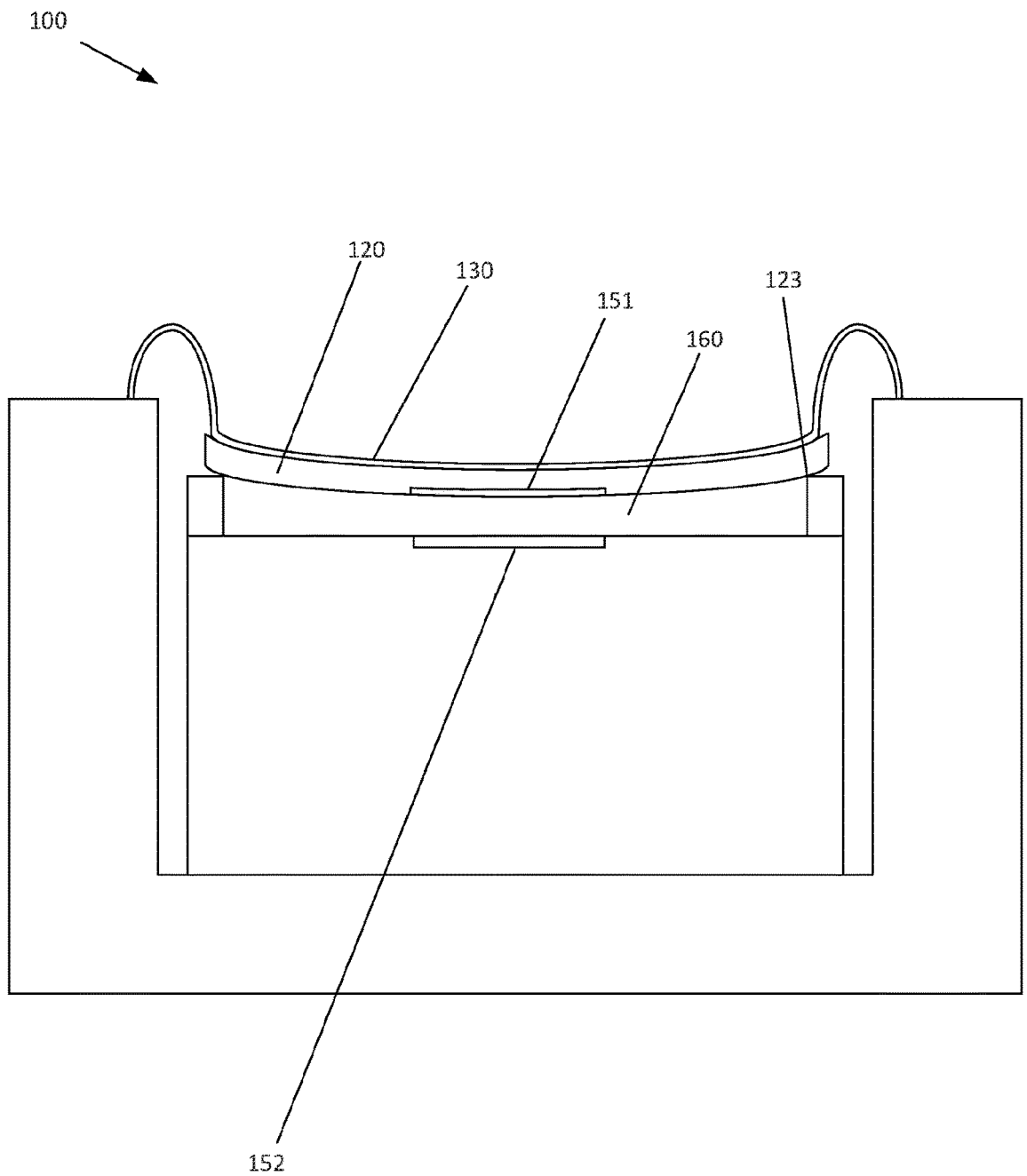
FIG. 6 is a schematic diagram of the implantable cardiovascular pressure sensor of FIGS. 1 to 5 under increased pressure from its surroundings.

Operation of the sensor 100 will now be described with reference to FIGS. 1 and 6. FIG. 6 shows the sensor 100 of FIG. 1 with the sensor 100 under pressure, i.e. with increased pressure in the fluid surrounding the sensor 100. As can be seen, in response to increased pressure, the membrane 130 has succumbed to the surrounding pressure and bent inwards in to the internal volume 160 of the enclosure 110. The membrane 130 is configured to move in response to changes in pressure, and the member 120 is coupled to the membrane 130 so that it moves with membrane 130. The membrane 130 is arranged to be sufficiently flexible so that force of the external pressure load can be transferred to the member 120.

In response to this force, the member 120 deforms until an equilibrium position is reached. In the equilibrium position, a force due to the increased external pressure will balance with forces due to: (i) deflection of the member 120, (ii) deflection of the membrane 130 and (iii) compression induced forces from the compressible fluid in the enclosure 110. The connection between the membrane 130 and the enclosure 110 is such that in response to movement of the membrane 130, the membrane 130 may still provide a hermetic seal for the internal volume 160. The ridges 134 of the membrane 130 are arranged to provide flexibility for the membrane 130. That is, in response to a substantial deformation of the membrane 130, there is still sufficient excess material to provide the hermetic seal. Other suitable shapes or connection mechanisms may be used to provide this effect.

The connection between the membrane 130 and the member 120 is such that pressure-induced deformation of the membrane provides a corresponding deflection of the member 120. The member 120 may be rigidly fixed to the base 140 at the attachment points 123 so that deflection of the member 120 at its ends 122 does not occur to the same extent as in the middle of the member 120. The coupling between the sides 121 and the rigid enclosure 110, as provided by the membrane 130, is such that the member 120 may be deflected in this region in a manner corresponding to the movement of the membrane 130 in that region. The internal volume 160 is hermetically sealed and the membrane 130 will move in response to changes in pressure of fluid surrounding the membrane 130. The extent of the movement of the membrane 130 will be dependent upon the pressure of the fluid surrounding the sensor 100.

As movement of the membrane 130 induces a deflection in the member 120, the member 120 will experience increased deflection as the pressure of the fluid surrounding the sensor 100 increases. In turn, this deflection of the member 120 provides an increase in the stress and strain experienced in the member 120. As will be discussed in more detail later, the first acoustic wave device 151 is arranged to determine an indication of these changes. The first acoustic wave device 151 may measure properties of the member 120 which are sensitive to deflection, i.e. measurements of these properties may provide an indication of the pressure of the fluid external to the sensor 100.

As shown in FIG. 6, a second acoustic wave device 152 may also be provided. However, the second acoustic wave device 152 will not undergo the same fluctuations in stress/strain as the first acoustic wave device 151 (e.g. because it is provided in a part of the sensor less affected by the deflection of the member 120). In some circumstances, the acoustic wave devices 151, 152 may be sensitive to fluctuations in local variables impacting the sensor 100, e.g. temperature. Whilst measurements from the second acoustic wave sensor 152 may not provide an indication of the stress/strain (i.e. deflection) in the member 120, in some circumstances they may provide measurement data which can be used to calibrate measurements from the first acoustic wave sensor 151. The acoustic wave devices 151, 152 are illustrated as single blocks or portions on the surface of the material of the member 120. This is not to be considered as limiting, as they may take many different forms (e.g. as shown in FIG. 7).

Examples of several suitable acoustic wave sensors will now be described.

Figure 7:
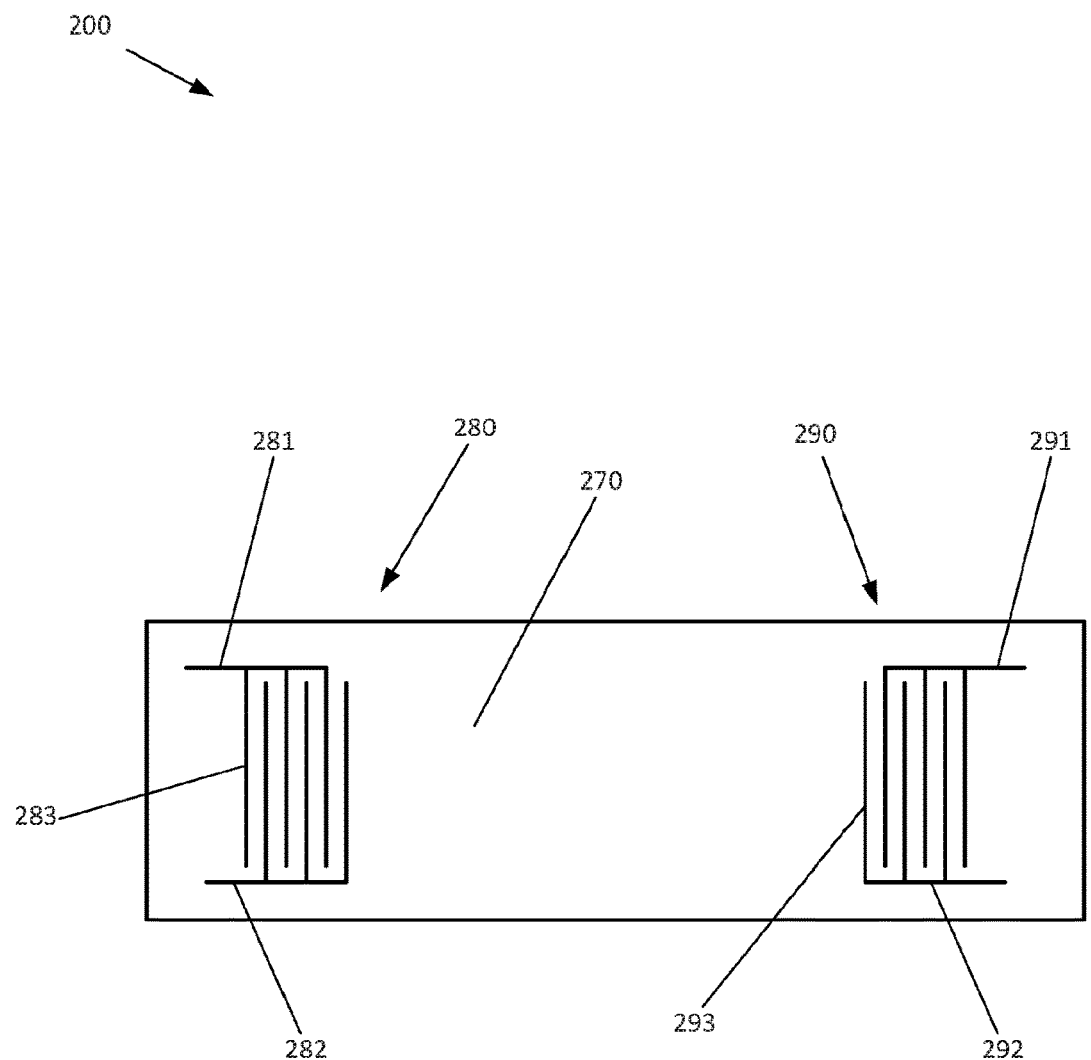
FIG. 7 is a schematic diagram of an example surface acoustic wave sensor.

One example of a possible configuration for a suitable acoustic wave sensor is shown in FIG. 7. FIG. 7 shows an acoustic wave sensor 200 comprising a first transducer 280 arranged to provide a pressure dependent signal in response to alternating electrical signals of a first frequency band. The acoustic wave sensor 200 also comprises a second transducer 290 arranged to provide a reference signal in response to alternating electrical signals of a second frequency band different from the first frequency band.

As one example (and as illustrated in FIG. 7), these transducers 280, 290, may comprise interdigitated transducers, IDTs, in which the frequency response is determined by the pitch of the IDT. Such transducers may comprise interdigitated conductive fingers disposed on a surface of a piezoelectric substrate. The frequency response of an IDT may also be affected by the mechanical stress and/or strain placed on the substrate.

Figure 11:
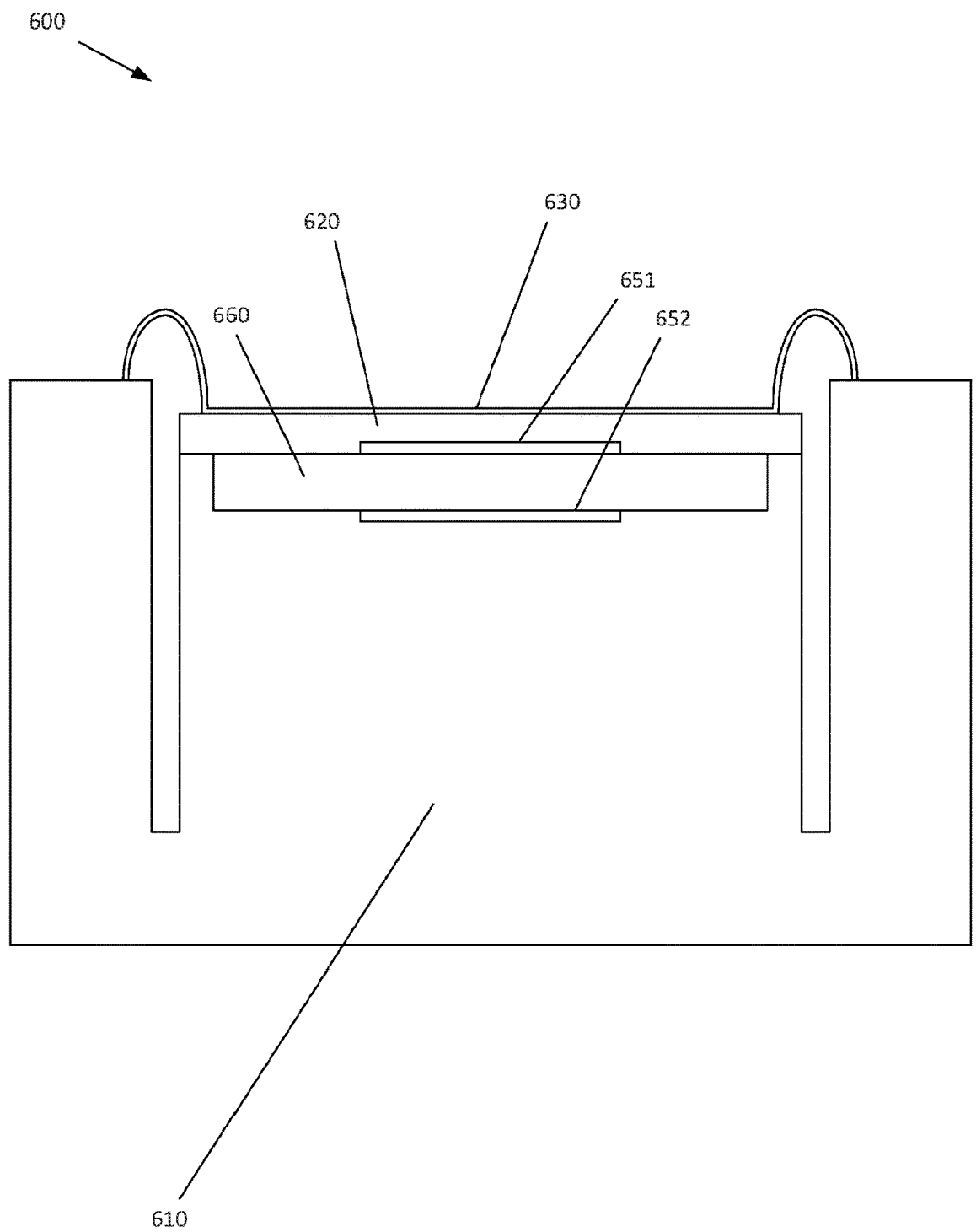
FIG. 11 is a schematic diagram of a cross section through an implantable cardiovascular pressure sensor.

As another example, transducers of an acoustic wave device may comprise bulk acoustic wave resonators (as shown in FIG. 11 and discussed below). In bulk acoustic wave resonators, the transducers maybe provided by conductive film electrodes deposited on the first and second major surfaces (i.e. the sides 121) of the member 120, which comprise a piezoelectric substrate. The frequency response of such a transducer is determined, at least in part, by the spacing between the conductive film electrodes (e.g. the thickness of the membrane) and also by the mechanical stress and/or strain placed on the membrane.

A pressure measurement may be made using one or more interdigitated transducers (IDTs), which form part of the assembly of components. IDTs typically comprise a series of interlocking comb-shaped conductive elements (as shown in FIG. 7). The pressure sensor 100 may be arranged so that the member 120 (or at least a portion thereof) provides a substrate for the one or more IDTs. Additionally, the base 140 may provide a substrate for one or more IDTs.

One or more of the IDTs may be arranged to detect a deflection of the member 120 as part of sensing the intravascular pressure. A specific arrangement may be that a first IDT is located in a region of the member 120 which is arranged to deflect due to changes in intravascular pressure. The IDT may then provide a measurement of pressure based on the induced stress in the member 120. Properties of the member 120, the membrane 130 and the compressed fluid may be known. On the basis of this, it is possible to determine, based on the movement of the member 120, the external fluid pressure. For example, as the member 120 may move into the compressible fluid (whose properties are known), it is to be appreciated that a correlation may be known (or determined) between the influence of the stress and/or strain on the acoustic wave measurement, and the extent of the movement of the member 120 into the compressed fluid held in the internal volume 160. As the thermodynamic properties of the compressed fluid are known, the extent of the deflection of the member 120 (and thus the ratio of the initial volume of the compressed fluid to the final volume of compressed fluid) will be correlated to the pressure of the fluid surrounding the sensor. It is to be appreciated that a relationship may also be known between the resistance to bending of the member 120 and the external pressure. Likewise, a relationship may also be known between the resistance to movement of the membrane 130 and the external pressure. Therefore, on the basis of these known relationships, by measuring an indication of the stress in the member 120, it is possible to determine the surrounding pressure.

A second IDT 290 could also be included which is located in a second region of the pressure sensor 100. Although the second IDT 290 is shown on the same substrate 270 as the first IDT 280, it is to be appreciated that they may be provided on different substrates. In some examples, the first acoustic wave device 151 may include a first IDT and a second IDT. Likewise, the second acoustic wave sensor 152 may include two IDTs. Alternatively, either acoustic wave device may only have one IDT (or more than two).

The second acoustic wave sensor 152 may be disposed in a region which is less easily deflected, for example it may be on a region of the member 120 which wholly or partially overlies the body and is rigidly coupled to it, e.g. in a region of the member 120 proximate to the rigid attachment points 123. In another example, the second acoustic wave sensor 152 may be provided on a separate component, such as the enclosure 110 or the base 140.

The first and second IDTs 280, 290 may be arranged to provide surface acoustic wave, SAW, devices, and may each operate either as "resonator" or "delay-line" devices. The function of "resonator" and "delay-line" type devices is explained below.

Whether the acoustic wave devices are implemented using SAW IDTs, or BAW resonators, the conductive elements which make up the assemblies of the acoustic wave devices may include one or more capacitors (not shown). Moreover, resistive and/or inductive elements (also not shown) may be included, to provide an LCR circuit to further help define the frequency range to which the assembly responds.

The member 120, and base 140 may comprise the same material, for example the material may be selected to reduce strains due to differential thermal expansion during the assembly process. This may mean that the member 120 and the base 140 may consist essentially of the same material, for example the same crystalline material. For example, the member 120 and the base 140 may both consist solely of the same material as each other. Moreover, this material may be a piezoelectric material such as quartz, since piezoelectric materials may be used as part of a surface acoustic wave (SAW) device, in combination with an IDT. It may be particularly advantageous to align each IDT with the same crystal direction of the substrate on which the IDT is provided. That is to say that the angle between the interlocked digits of the IDT and a particular crystalline axis is the same for each IDT.

The first transducer 280 and the second transducer 290 may each comprise interdigitated transducers, IDTs, on a substrate 270 (such as the member 120 described above). These may be either "resonator" or "delay-line" type SAW devices. As such, both may comprise an active IDT and either a reflector structure such as a plurality of "reflector lines"—an array of parallel lines of conductive material on the surface of the substrate. Such "resonator" and "delay-line" type devices will now be described in more detail.

It will be appreciated in the context of the present disclosure that surface acoustic waves can be formed on the surface of a piezoelectric substrate by applying alternating voltage to an IDT on that substrate. The wavelength of such a surface acoustic waves is set by the pitch of the IDT fingers, $\lambda$. Surface acoustic waves have a characteristic velocity, v, on such a surface. Thus by applying a voltage to the fingers of the IDT at the appropriate frequency, f, such that $v=f\lambda$, the voltage will generate surface acoustic waves. Energy is transferred onto the substrate (electrical energy input, mechanical energy stored in the waves), and the surface acoustic waves propagate across the surface of the substrate, perpendicular to the fingers of the IDT. For a "resonator" type device, the waves are reflected back across the surface of the substrate towards the IDT which generated them. This may be done by a tuned reflector (e.g. a series of reflector lines, such as lines of conductive material on the surface, with a pitch selected to reflect the SAW). It will be appreciated in the context of the present disclosure therefore that one possibility for a "resonator" type device is to have an IDT on a substrate with reflectors to either side of it, parallel to the IDT fingers.

The reflection on each reflector line is quite small, so each reflector may have at least one hundred lines, for example at least two hundred, for example at least 500. The energy of the surface acoustic wave will thus be contained in the mechanical vibrations of the surface between the reflectors. Stretching the surface of the substrate in a direction perpendicular to the IDT and reflector fingers will change the pitch of both the IDT and the reflectors so that the natural resonance frequency changes. This can be used as the basis of a strain—or pressure-transducer. The incoming electrical excitation, applied to the substrate by the active IDT is fairly close to the natural frequency of that IDT. A short pulse of excitation (typically 1 μs) generally provides a pulse bandwidth which is broad enough (typically 1 MHz) to cover the natural frequency of the IDT whether stretched or unstretched—other durations and bandwidths may be used. When the excitation pulse ends, the resonator will resonate only at its own natural frequency for a short time until most the mechanical energy in the surface acoustic waves has been re-emitted as electrical energy from the IDTs.

For a "delay-line" device, the surface acoustic wave can be allowed to escape the immediate vicinity of the IDT and travel across the surface to one of: (i) a reflector; and (ii) another IDT. In the first case, the reflector will reflect the surface acoustic wave back to the source IDT. In the second case the other IDT converts the incoming surface acoustic wave to an electrical pulse at the frequency of the surface acoustic wave. A "delay-line" type device can be used as a strain or pressure transducer in either case. It is therefore to be appreciated that each surface acoustic wave sensor may comprise one or more IDTs.

In the case where a reflector is used, a short alternating voltage pulse is applied to the IDT (via electrical connections or an aerial); a short pulse of surface acoustic waves is emitted from the IDT and travels over the surface to the reflector. The reflector will reflect the surface acoustic wave back to the source IDT; a short electrical pulse is generated at the source IDT (for detection or transmission from the aerial). The double transit time (between the excitation pulse leaving the source IDT and the reflected pulse arriving back at the source IDT) gives a measurement of the strain or pressure, because both the speed of the surface acoustic wave and the distance travelled have a known relationship with surface stress and strain and hence with pressure. In the case where a second IDT is used, the excitation pulse travels over the surface to the second IDT. The second IDT converts the incoming SAW to a short electrical pulse.

The single transit time (between the excitation pulse leaving the source IDT and its arrival at the second IDT) gives a measurement of the distance travelled. Where resonator type devices are used, the reference transducer may be tuned so that its natural resonance frequency is different to that of the active resonator e.g. the transducer arranged to provide a pressure dependent signal. Generally the natural frequency of the active and reference transducers will be separated by at least 1 MHz, for example at least 2 MHz. As explained above, the reference transducer can be arranged on the substrate so as to be less sensitive to pressure than the active resonator—e.g. to be wholly or partially insensitive to pressure. Because it resonates at a different frequency its IDT can be connected in parallel with the IDT of the active resonator. The excitation signal can be tuned to each resonator independently, so we receive a return signal containing only one natural resonant frequency—either active or reference. This can enable the two signals to be compared to estimate pressure.

The elongate compliant member 120 (e.g. as shown in FIG. 1), may provide the substrate for these IDTs. For example, the electrical components of a first transducer, of the type described above, are located on the member 120 such that when the sensor 100 is assembled (which in this case comprises the ends 122 of the member 120 being supported by the enclosure 110—i.e. the base 140), the first electrical components will be located above the compressed fluid in the internal volume 160. This arrangement is shown by the first acoustic wave device 151 of FIG. 2. Thus, this arrangement may facilitate a greater deflection of these components, and thus greater stress and/or strain being induced. Conversely, a second acoustic wave device 152 be located in the pressure sensor 100 such that when the sensor 100 is assembled, the second acoustic wave device 152 is more rigidly supported and is not in a region likely to undergo substantial deflection.

The electrical components of the acoustic wave devices may be arranged on a surface (e.g. of the member 120/base 140), and connected together via electrical connections in a parallel arrangement. The electrical connections may also be connected to two couplings for connecting an antenna to the electrical components. This may also be provided in a parallel configuration. The electrical components may comprise the first transducer 280, and the second transducer 290. The first transducer 280 is arranged to provide a pressure dependent signal in response to alternating electrical signals of a first frequency band, and the second transducer 290 is arranged to provide a pressure dependent signal in response to alternating electrical signals of a second frequency band. The first and second frequency bands are different. The electrical components may each comprise an active IDT and reflectors—for a "resonator" or "delay-line". If the transducers comprise "delay-line" type transducers, the components may each comprise a source IDT which generates a surface acoustic wave and a receiving IDT which converts that surface acoustic wave to an electrical signal for transmission.

For example, the acoustic wave sensor 200 of FIG. 7 may provide a delay-line surface acoustic wave device. One such sensor 200 may form the first acoustic wave device 151 shown in FIG. 2. Another such sensor 200 may provide the second acoustic wave device 152 shown in FIG. 2.

Both transducers 280, 290 may be connected to the same antenna couplings, but in some embodiments, each transducer may be connected to a different antenna. Where a single antenna is used, the bandwidth of the antenna may be sufficiently broad that a passband of the antenna encompasses the resonant frequency of both transducers 280, 290.

Although the two transducers have been described in a parallel arrangement with each other and with the antenna, embodiments exist in which some or all of these components are arranged in series with one another. This may be done in a variety of different ways. For example, significant signal loss may be acceptable, so a simple series circuit can be used. Alternatively, frequency selective bypass circuits may be placed in parallel with each transducer. The bypass circuit in parallel with the first transducer may be tuned to the frequency band of the second transducer, and the bypass circuit in parallel with the second transducer may be tuned to the frequency band of the first transducer.

In this way, even if the two are connected in series, the first transducer can be arranged to provide a pressure dependent signal in response to alternating electrical signals of a first frequency band and the second transducer can be a reference signal in response to alternating electrical signals of a second frequency band different from the first frequency band. As will be appreciated by the skilled addressee in the context of the present disclosure, other electrical arrangements are possible.

Although the Figs do not include an antenna, some embodiments may be provided with one or more antennas for receiving RF signals, connected to antenna couplings (also not shown in the Figs.). Such an antenna may be arranged to operate at frequencies within a particular bandwidth. In particular this bandwidth may be chosen to encompass the first and second frequency bands, corresponding to the first and second transducers.

The transducers may be arranged to respond to pressure changes in their environment by detecting changes in the resonance characteristics of the transducer. For example, as described above, external pressure may change the shape of the transducer assembly (i.e. bend the member 120 which provides the transducer assembly), which in turn may alter various measurable physical properties of each transducer. Such physical properties may include by way of example: resonance characteristics such as resonant frequency; speed of propagation of vibrations; physical separation of various components; and/or electrical properties. In particular, each transducer may be arranged to change its resonant frequency in response to pressure changes, or to introduce a pressure dependent time delay.

The two transducers may respond differently to pressure changes. For example, the change in a measurable physical property of the first transducer may be greater than the change in that same physical property of the second transducer. This may be achieved by one or more of: arranging the substrate of the transducers to respond differently, for example allowing the substrate of one transducer to distort more in response to pressure changes than the substrate of the other transducer; by mounting each transducer on a different substrate material, each material chosen to respond to pressure in a different manner. In some embodiments, where the substrate material is crystalline, such as quartz, it may be achieved by mounting the two transducers at different orientations relative to the crystal axes of the substrate upon which they are supported. This may provide a measure of temperature changes due to differential thermal expansion along the different crystal axes.

A particular example of a pressure dependent response is based on the degree to which part of the device can deflect due to pressure changes, that is providing a different degree of deflectability to different parts of the device. Specifically, this may include providing a deflectable member and a reference member in the device. As an example, the member 120 may provide the deflectable member, and the base 140 may provide the reference member. Just as part of the member 120 may deflect to provide this pressure dependent response, any other type of deflectable member may also be used as a substrate. Likewise, the substrate of the second acoustic wave device may comprise a portion of the member 120 which is less able to deflect in response to pressure changes, or a separate component of the sensor 100, e.g. the base 140. A portion (e.g. an end 122) of the member 120 may be more rigidly fixed than a deflectable part of the same member 120 to provide this reference response, any other type of reference member may also be used as a substrate. Typically the reference member and the deflectable member comprise the same material.

As a specific example, in the case where the transducers comprise IDTs, a change in the physical dimensions of the substrate on which the IDTs are supported may cause a change in the dimensions of the IDT. This in turn may change the separation of the interlocked digits, or other physical dimensions of the IDT, which may cause a change in the resonant frequency of the transducer. Additionally or alternatively, such a change in the physical arrangement of components may cause a pressure dependent time delay to be introduced into the measurement. For example, a transducer may comprise two IDTs; a source and receiver IDT. The measurement may comprise triggering the source IDT to emit a surface acoustic wave (SAW), and measuring the time delay until the receiver IDT receives the SAW. Such a system could also be provided using a single IDT and one or more reflectors, wherein the IDT is triggered to emit a SAW, and measure the time delay for the SAW to reach the reflector(s), be reflected back towards the IDT, and be received by the IDT.

In either of the above cases, when the substrate has been deflected so that the IDT is on the convex surface, the time delay will be longer than it would be for an un-deflected substrate, as the path travelled by the SAW is longer than in the un-deflected case. Similarly, the distance between the interlocked digits of the IDT (the interdigital distance) becomes larger. Conversely, when the deflection is such that the IDT is on the concave surface, the surface on which the IDT is supported contracts and the path length and interdigital distance become shorter, this may be associated with a shorter time delay than in the un-deflected case. It will be appreciated by the skilled addressee in the context of the present disclosure that the surface with the IDTs on it is in tension when the external pressure is above the internal pressure and under compression when the external pressure is below the internal pressure The one or more walls of the sensor 100 (i.e. as provided by the membrane 130) which deflect in this way can be selected by ensuring that those walls are more deflectable than the walls which are not intended to deflect in this way (i.e. of the rigid enclosure 110). For example, in FIG. 2 the membrane 130 is shown as being thinner than the walls of the enclosure 110, and so will deflect more than the other walls. In particular embodiments, the design may ensure that some of the walls do not deflect at all, or that the deflection of some walls is negligible compared with the deflection of other walls, when the external pressure changes. Likewise, the separation between the sides of the member 120 and the walls of the enclosure 110 may be selected to inhibit any deformation of the membrane 130 into, or away from, the internal volume 160 without providing a corresponding deflection of the member 120. The membrane 130 shown in the Figs. may have a thickness of between 5 μm and 200 μm, for example, or more specifically between 10 μm and 100 μm, and in particular between 20 μm and 60 μm.

As described above, there are many ways in which the deflectability of part of the device may be altered, only one of which is to change the material from which different parts of the device are made. Some embodiments of the device may therefore be constructed substantially from a single material. In particular, the deflectable member and the reference material may be made from the same material. For example the transducers (mounted on either the deflectable member or the reference member) are mounted on a single component. That is to say that the reference member and the deflectable member may comprise different portions of the same part of the device. For example, the two members may be different parts of the member 120.

A further development of this concept is that the reference and deflection members may have the same crystal plane orientation. In the case where the reference and deflection members are different portions of the same component, this may be easily achieved by forming the component (e.g. member 120) from a single crystal. Whichever method is used to achieve this, when the reference and deflection members have the same crystal plane orientation the two transducers may be provided such that they are each aligned with the same crystallographic direction simply by orienting the two transducers so that they are mounted on the substrate aligned with one another. Arranging the transducers in this way can help to ensure that the only differences between the output provided by the transducer associated with the reference member and the transducer associated with the deflectable member are due to the different responses of each transducer to pressure.

In particular, embodiments of the disclosure may control for the effect of temperature on the pressure measurement. For example, they may be arranged to compensate for the fact that an increase in temperature may cause a thermal expansion of some or all of the components. The reference and deflection members may be arranged to be equally affected by such changes in temperature, thereby thermal effects can be accounted for. For example, by ensuring that the reference and deflection members have the same orientation (with respect to the crystal axes of the substrate), any anisotropic thermal expansion effects can be controlled for. The benefit of this is further increased when the transducers themselves are also aligned with the same crystal direction. For example, the velocity of surface acoustic waves may depend on the propagation direction of those waves, and so the temperature coefficient of the velocity may also depend on propagation direction. The active and reference transducers may be aligned in the same direction, and a temperature sensor may be provided by providing a transducer which is aligned at a selected angle (say) 45° to the other and performing a differential measurement. It will thus be appreciated that the provision of a third transducer, aligned at a different angle to the other two (mutually aligned) transducers can provide two independent variable measurements—pressure and temperature together. This third transducer may be tuned to a different frequency band from the first and second transducers.

In bulk acoustic wave resonators, the transducers may be provided by conductive film electrodes deposited on the first and second major surfaces of the member 120. This member 120 comprises a piezoelectric material. The frequency response of such a transducer is determined, at least in part, by the spacing between the conductive film electrodes (e.g. the thickness of the membrane) and also by the mechanical stress and/or strain placed on the membrane. In addition, such transducers may comprise further conductive elements, in addition to the electrodes, which provide reactive impedance (such as capacitance and/or inductance). This reactive impedance can be selected to shift the resonant frequency of BAW transducers having the same type and thickness of substrate (membrane) between their electrodes.

For BAW resonators, an antenna coupling may be provided for electrical connection of the transducers with an antenna. The first transducer and the second transducer may be arranged electrically in parallel with each other and with this antenna coupling so that electrical signals from an antenna can be applied to both the first transducer and the second transducer.

Whether by selecting the thickness of the member or by the provision of additional reactive impedance in the transducer, the reference BAW transducer may be tuned so that its natural resonance frequency is different to that of the active resonator e.g. the transducer arranged to provide a pressure dependent signal. Generally the natural frequency of the active and reference transducers will be separated by at least 1 MHz, for example at least 2 MHz. As explained above, the reference transducer can be arranged on the substrate so as to be less sensitive to pressure than the active resonator—e.g. to be wholly or partially insensitive to pressure. Because it resonates at a different frequency it can be connected in parallel with the test transducer. The excitation signal can comprise frequency components selected to excite each resonator independently, so we receive a return signal containing only one natural resonant frequency—either active or reference. This can enable the two signals to be compared to estimate pressure.

The transducers may be carried on a member, and connected together electrically in parallel between two couplings for connecting an antenna to the transducers. As above, the first transducer is arranged to provide a pressure dependent signal in response to alternating electrical signals of a first frequency band, and the second transducer is arranged to provide a pressure dependent signal in response to alternating electrical signals of a second frequency band. The first and second frequency bands are different.

As shown, both transducers are connected to the same antenna couplings, but each transducer may be connected to a different antenna. Where a single antenna is used, the bandwidth of the antenna may be sufficiently broad that a passband of the antenna encompasses the resonant frequency of both transducers.

As will be appreciated by the skilled addressee in the context of the present disclosure, other electrical arrangements are possible such as those described above for SAW transducer systems. Pressure sensitivity may also be provided in a similar way—e.g. by providing one BAW transducer on a reference member and another on a test member which is deflected more than the reference member by changes in intravascular pressure. The test member and reference member may be provided by different regions of the same substrate (e.g. member 120) as explained above.

The antenna coupling (e.g. as has been described herein) may comprise electrical and mechanical fixings for holding an antenna in place and electrically connecting it to the transducers. Examples include vias at least partially through the body of the device, a trench for holding an antenna stem in place, and metallisation of one or more surface regions to provide conductive areas for connection to an antenna. Some examples of antenna couplings may include impedance matching circuitry and/or frequency selective structures such as filters.

In operation, a device external to the body may provide signals to an antenna arranged to output these signals as electromagnetic radiation. This radiation is transmitted through the body to the sensor 100. The sensor 100 receives the electromagnetic radiation, which triggers the sensor to respond with a pressure-dependent response, as described above. The response is transmitted back to the device external to the body. For example, this may be emitted as electromagnetic radiation which is received by the antenna of the external device. In turn, this signal is passed on to a computer where information can be extracted relating to the pressure in the environment surrounding the sensor 100.

Moreover, as described herein, two responses may be received; a test response and a reference response. These responses may relate, for example to a first signal provided by the first transducer, and a second signal provided by the second transducer. As described above, these may relate to a strongly pressure dependent result, and a result that is largely pressure independent. In this way the two results can be used together to determine the pressure in the location of the device, accounting for variations due to other factors, e.g. temperature.

As described above in more detail, the test and reference responses may be arranged to interrogate each of the first and second transducers of the device respectively. This may be achieved by arranging the first transducer to respond to frequencies in a first band, and arranging the second transducer to respond to frequencies in a second band, wherein the first and second frequency bands are different. In particular, the first and second bands may have no or only a negligible overlap with one another.

Moreover, the device external to the sensor may use a signal provider (for example the antenna) which may be arranged to provide an alternating electrical signal suitable for powering the implantable device. For example, the antenna may output electromagnetic radiation which is not only strong enough to penetrate the body in which the sensor is implanted, but which also is strong enough to power and excite the implanted sensor. In this context, the strength of the electromagnetic radiation refers to the intensity of the radiation emitted by the antenna.

The specific illustration of the exemplary surface acoustic wave device 200 of FIG. 7 will now be described in more detail. Here two IDTs 280, 290 are shown mounted on a piezoelectric substrate 270. For example, this may be in the form of a delay-line arrangement as discussed above. The acoustic wave device 200 comprises a first IDT 280 and a second IDT 290.

The first IDT 280 comprises a series of interlocked fingers 283 of a conductive material spaced apart from one another. In addition, connectors 281 and 282 link alternate interlocked fingers 283 together to form two interlocked comb shapes. Likewise, the second IDT 290 comprises a series of interlocked fingers 293 of a conductive material spaced apart from one another. In addition, connectors 291 and 292 link alternate interlocked fingers 293 together to form two interlocked comb shapes.

In the event that a positive voltage is applied to e.g. a first one of the connectors of the first IDT 281, relative to the other connector 282, regions of the piezoelectric substrate 270 are caused to contract, while others may expand, due to the piezoelectric effect. If the voltage applied to the connectors is now reversed, different areas now expand and contract. When the supplied signal is periodic, a surface acoustic wave (SAW) may be generated. To achieve this, the connectors 281 and 282 may be connected to a signal provider such as an antenna.

IDTs may be arranged to respond to a specific frequency band by choosing the spatial arrangement of the interlocked fingers. For example, the width of each finger, the separation between adjacent fingers, the length of each finger and/or the overlap between the two interlocking combs may all affect a resonance characteristic of an IDT, and consequently affect the frequency band to which that IDT responds. In an embodiment the membrane carrying the IDTs comprises quartz. Such embodiments may exhibit excellent temperature stability and high Q factor. The alignment of the transducer fingers (e.g. with respect to the crystal) and/or metallisation ratio of the IDTs (e.g. the ratio between the width of each finger and the spacing between fingers) and/or the metallisation thickness of the IDTs may be selected to provide a low (e.g. zero) temperature coefficient in the range of likely body temperatures e.g. 35° C. to 37° C. As an alternative to quartz, it is possible to use Aluminium nitride or Zinc Oxide piezoelectric films but the stability of the single-crystal quartz is better over the projected lifetime of the sensors (50 years possibly).

The deflection (e.g. flexing) of the substrate 270 described above (e.g. due to pressure changes) will change the separation between the interlocked fingers 283 on the surface of the substrate 140. This change in separation will alter the frequency of a resonator or group delay of a delay device.

An acoustic wave may be instigated at the first IDT 280 by a stimulating radio frequency (RF) pulse received for example by an antenna from a source not shown external to the body. The second IDT 290 may be used to receive this SAW, and convert it back to an electrical signal by a process which is effectively the reverse of the SAW generation process described above. Alternatively, a SAW reflector may be used to reflect the SAW back towards the IDT from which it originates. In this mode, the IDT operates as both a source and receiver. In either case, the electronic signal so generated by reception of a SAW by an IDT may be sent to an external device for further processing to determine properties of the environment in which the IDT is situated, e.g. local pressure. In a "delay-line" based device, this measurement may be based for example on the time delay between emission and receipt of a SAW, or in a "resonator" device the measurement may be based on a frequency shift introduced by the device.

Figure 8:
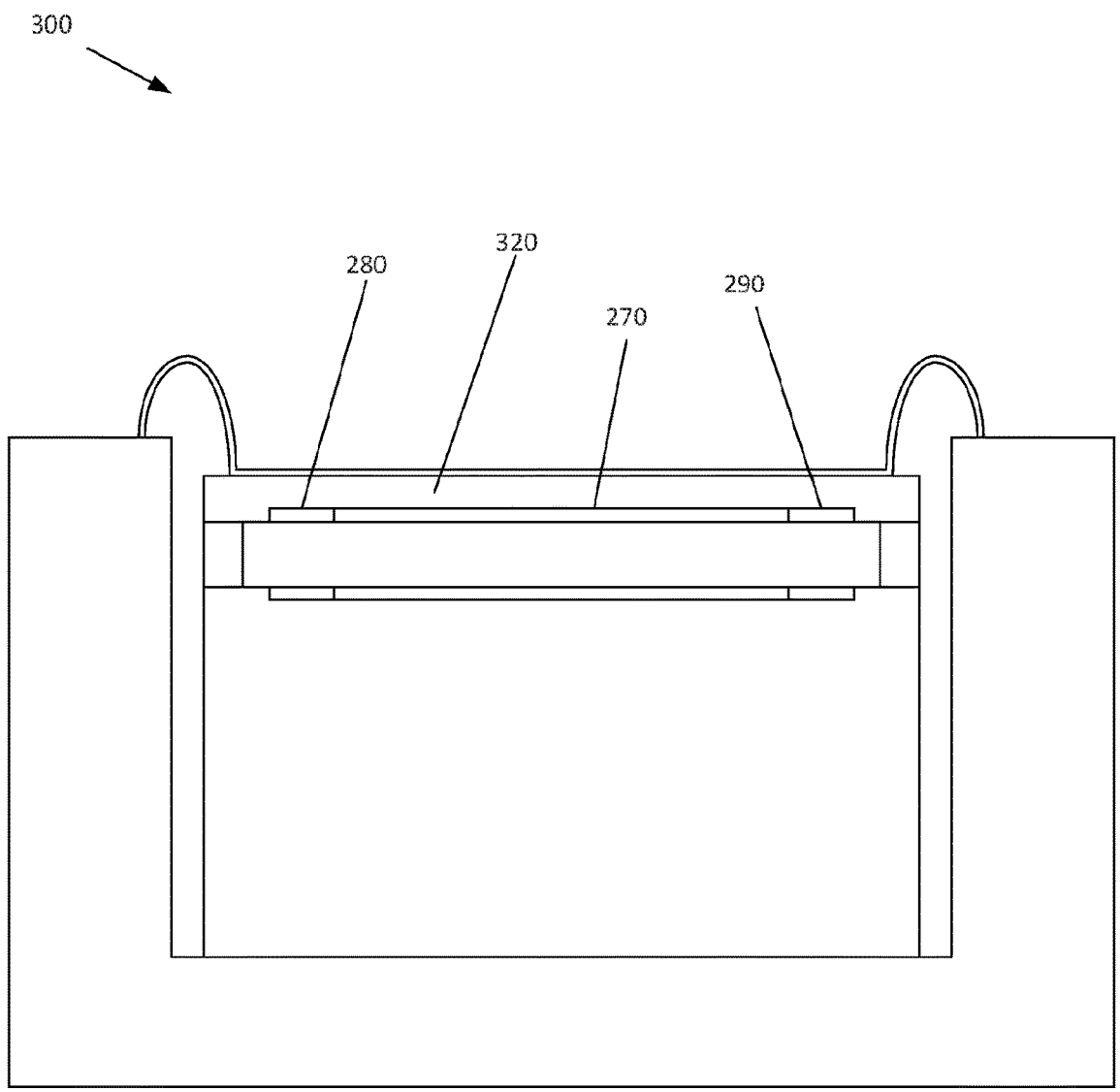
FIG. 8 is a schematic diagram of a cross section through an implantable cardiovascular pressure sensor having the surface acoustic wave sensor of FIG. 7.

FIG. 8 shows an exemplary pressure sensor 300 in which each of the first and second acoustic device is provided by a delay-line type surface acoustic wave device, e.g. of the type shown in FIG. 7. The separation of the two IDTs 280, 290 may be selected to be a substantial portion of the entire length of the member 120. For example, this may enable the provision of larger, and thus easier to measure, time delays. Similar to elongate compliant member 120 of FIGS. 2-6, 320 depicts the elongate compliant member in FIG. 8.

Figure 9:
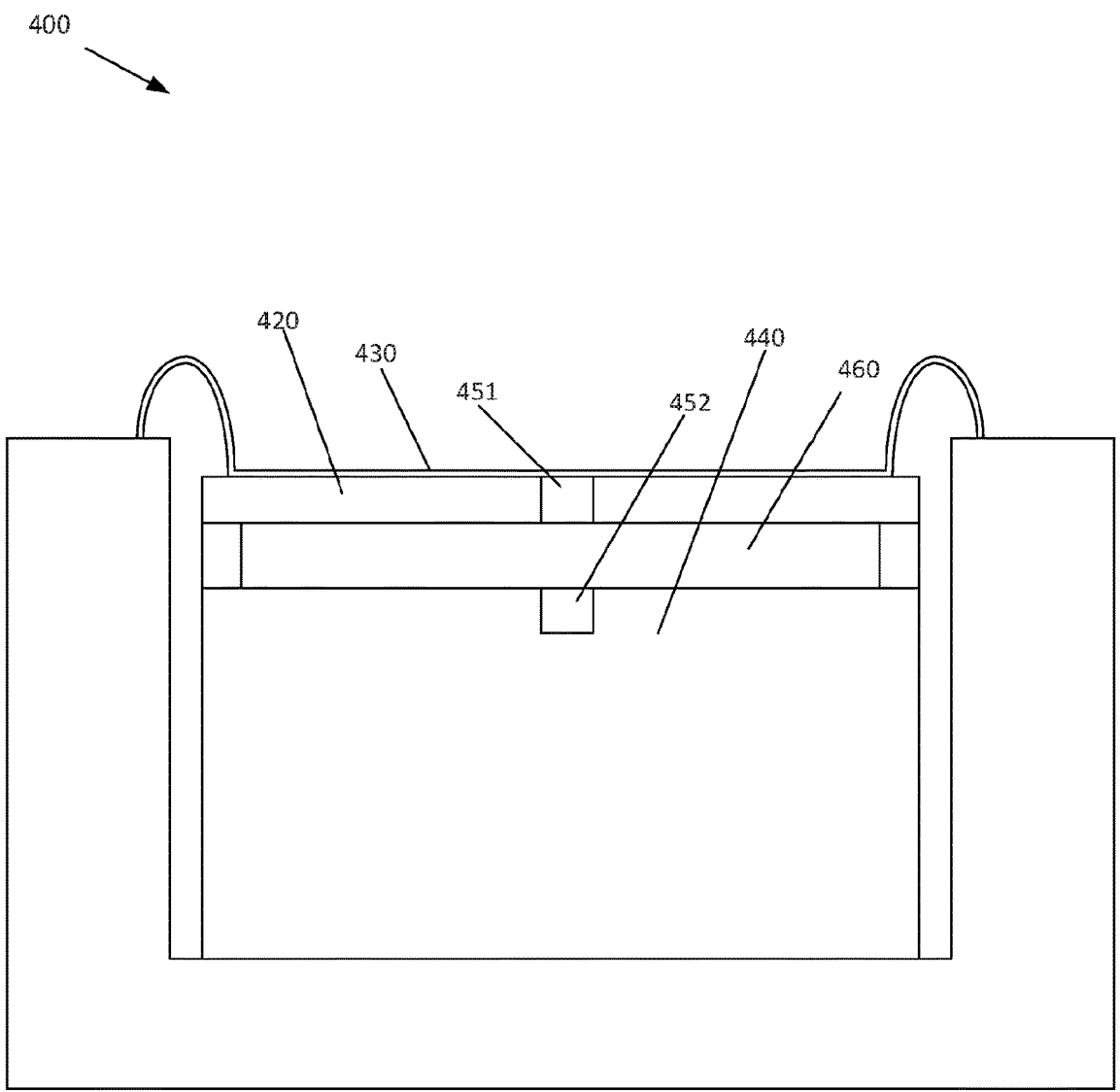
FIG. 9 is a schematic diagram of a cross section through an implantable cardiovascular pressure sensor.

FIG. 9 shows an exemplary pressure sensor 400 in which the first acoustic wave device 451 and the second acoustic wave device 452 are provided by BAW devices. As described above, these may be provided by electrodes located on either side of the member 420 separated by its width. As such, in the cross-section of FIG. 9, only one electrode can be seen. As shown, the first BAW device is provided in the member 420 and the second device is provided in the base 440. Similar to flexible membrane 130 of FIGS. 2-4, 430 depicts the flexible membrane in FIG. 9. Similar to internal volume 160 of FIGS. 2, 3 and 6, 460 depicts the internal volume in FIG. 9.

Figure 10:
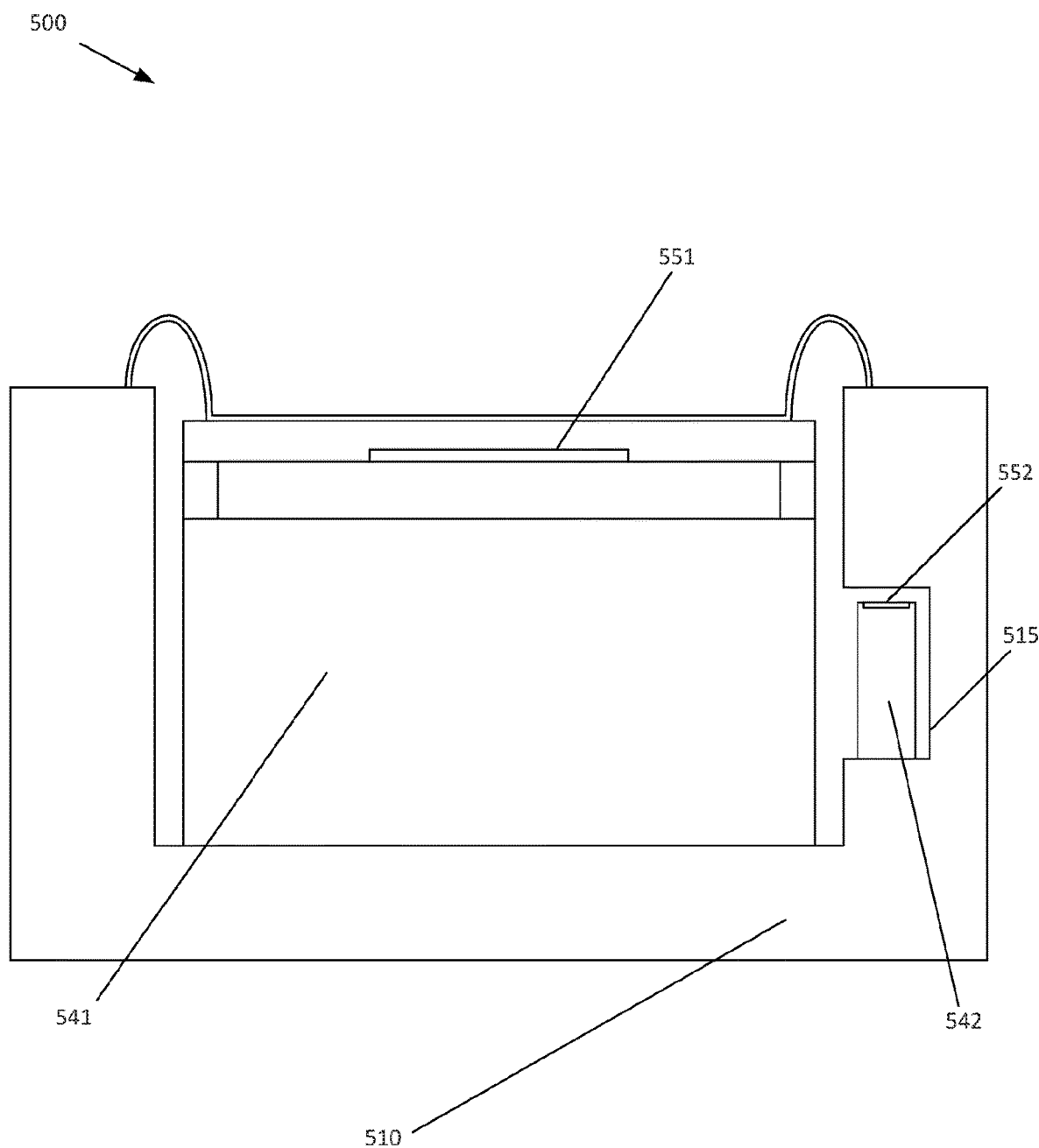
FIG. 10 is a schematic diagram of a cross section through an implantable cardiovascular pressure sensor.

FIG. 10 shows an exemplary pressure sensor 500 in which a first acoustic wave device 551 is provided by the member and a second acoustic wave device is provided, which is not in a base 541 of the sensor 500. Rather, the second acoustic wave device 552 is provided by a second piece of piezoelectric material 542, which is provided in an enclave 515 of rigid enclosure 510. As shown, the pressure-dependent measurement provided by the member 520 can be isolated from the second acoustic wave device 552. The second acoustic wave device 552 may be provided by any suitable location or component of the sensor, so that it can provide a relatively pressure-independent measure. Of course, it may still be possible to only utilise one pressure sensor 551, with known values for converting acoustic wave measurements into corresponding pressures.

FIG. 11 shows an exemplary pressure sensor 600 in which there is no base, and instead the rigid fixing between compliant member 620 and enclosure 610 is direct (i.e. there is no intermediary connection). As such, there are no spacers for providing a raised platform from which the member 620 may deflect. Instead, this is provided by the shape of the rigid enclosure, which may be u-shaped in cross-section. It is to be appreciated that any suitable configuration may be provided for supporting (e.g. rigidly fixing) the member 620 in the enclosure 610 so that it may be deflected sufficiently for pressure-dependent measurements to be made. Similar to flexible membrane 130 of FIGS. 2-4, 630 depicts the flexible membrane in FIG. 11. Similar to first acoustic wave device 151 of FIGS. 2, 3, and 6, 651 depicts the first acoustic wave device of FIG. 11. Similar to second acoustic wave device 152 of FIGS. 2, 3, and 6, 652 depicts the second acoustic wave device of FIG. 11. Similar to internal volume 160 of FIGS. 2, 3 and 6, 660 depicts the internal volume in FIG. 11.

Figure 12:
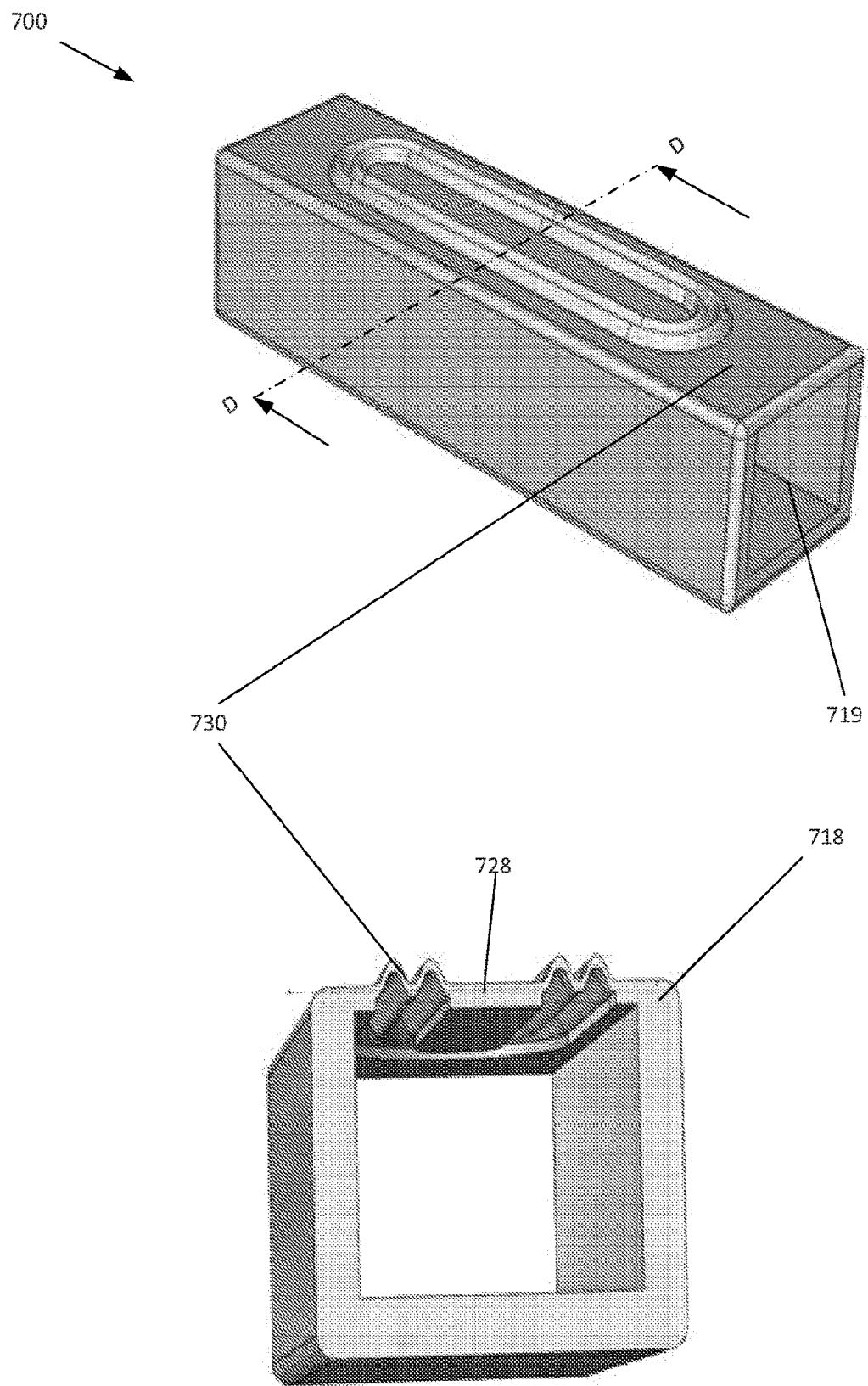
FIG. 12 is a schematic diagram of an enclosure for an implantable cardiovascular pressure sensor.

FIG. 12 shows an enclosure 700 for an implantable cardiovascular pressure sensor.

The enclosure 700 shown in FIG. 12 is a four sided box, it is long and narrow (e.g. its length is greater than its width or depth). The ends 719 of the box are open. The open ends can be closed and sealed to form a sealed enclosure. The wall of this box 718 may be integrally formed, e.g. the material which makes it up may be deposited onto a former such as a sacrificial mandrel, to create the wall 718. Generally the thick parts of the wall are thick enough to rigidly withstand (e.g. not to be deformed by) external fluid pressure of about 0.25 bar. The wall thickness required for this depends on the material used, and the construction of the wall 718. The wall 718 may comprise, or consist essentially of, a single material. In FIG. 12, the material is a biocompatible metal, such as gold, to facilitate implantation in the human body.

A wall of the enclosure 700 comprises a compliant region 730, including a part where the material is thinner than rest of the wall. This thin part of the wall occupies a stadium shaped annular area of the wall (e.g. an area between the boundaries of two concentric stadia). This may surround a similarly shaped region of the wall 728 which is thicker than the thin part. The thin part of the wall may be corrugated, and the line of the corrugation (e.g. the path of the one or more grooves and/or ridges which make up that corrugation) may follow a stadium shape. This is one way to provide a corrugated diaphragm. The thin corrugated part of the wall, the region it surrounds, and the wall itself may be integrally formed from the same material.

The corrugated thin part in the wall is more flexible than the other parts of the wall, thus the part of the wall surrounded by this stadium shape can be displaced relative to the wall (e.g. into or outward from the enclosure in response to changes in a pressure difference across the wall (e.g. a difference in fluid pressure at one surface of the wall as compared to the other side of the wall).

The structure illustrated in FIG. 12 is one way to provide a flexible feature in the wall of the enclosure. This flexible feature is compliant in the sense that it can be displaced relative to the plane of the wall in which it is disposed. Other ways may be used to provide such a compliant region 730 in the wall—for example a variety of concertina and bellows structures may be provided. Typically, thinning of the wall is helpful in ensuring that the compliant region 730 is more easily displaced than the rest of the wall.

The thin corrugated part of the wall is described with reference to FIG. 12 as being stadium shaped. However it will be appreciated in the context of the present disclosure that other shapes may be used. Generally, rounded shapes such as stadia, circles, ovals, rounded rectangles, and other shaped with rounded corners have been found to be useful because the rounded corners can facilitate the provision of corrugations.

As noted above, the thin corrugated part of the wall 730, the region it surrounds 728, and the wall 718 itself may be integrally formed from the same material. This material may be biocompatible metal, but it need not be gold, and indeed may not even be metal. For example, polymers such as silicon polymers may also be used. Such polymers may be rendered impermeable by a process of atomic layer deposition to create one or more layers of inorganic glassy oxide. There are different ways to integrally form the compliant region 730 in the wall. Instead of being formed by deposition the wall 718 and compliant region 730 may be integrally moulded from a single piece of material, onto a former such as a sacrificial mandrel. Examples of suitable deposition methods include sputtering, chemical electro deposition, and atomic layer deposition.

In use, as will be explained below, a transducer can be disposed inside the enclosure for sensing movement of the compliant region 730 of the wall.

An enclosure 700 such as that described with reference to FIG. 12, can be formed by depositing material onto a sacrificial mandrel. The material may be deposited in one or more layers—e.g. by chemical electrodeposition (so-called electroforming). This mandrel may comprise a forming feature, such as a number of ridges and/or grooves. These forming features can be arranged so that a layer formed over them provides a compliant region 730 as described above.

To detach the wall 718 from the mandrel, the mandrel may be removed for example be being etched away, e.g. by a chemical etch. Once the mandrel has been removed, the remaining wall structure 718 provides a four sided enclosure with a compliant region on one of its sides.

A deflection sensor, such as a piezoelectric beam, may be fixed inside the enclosure and coupled to the compliant region 730. The compliant region may thus act to transfer external fluid pressure load to the piezoelectric beam to cause deflection of the beam. A surface acoustic wave device, such as an interdigitated transducer may be disposed on a surface of the beam for sensing said deflection. Thus, once the enclosure 700 has been sealed, variations in external fluid pressure can cause displacement of the compliant region into or outward from the enclosure.

The method may comprise providing the deflection sensor into the enclosure, and fixing it in place—e.g. by bonding it to a wall of the enclosure. The deflection sensor may comprise a second acoustic wave transducer, arranged to provide a reference for the first acoustic wave transducer. For example, the second acoustic wave transducer may be disposed on a piezoelectric substrate that is deflected less by displacement of the compliant region than a substrate of the first acoustic wave transducer. The two transducers may be provided on the same substrate material. This may enable the second transducer to provide a reference signal to control for variations in the response of the first acoustic wave transducer that are not due to deflection (e.g. variations due to changes in temperature).

Once the deflection sensor has been disposed in the enclosure 700, the enclosure 700 may be closed by sealing a dielectric end cap (e.g. a glass or ceramic plug) to an end 719 of the enclosure 700. This may end cap may comprises a fixture for holding an antenna, for example wherein the sensor comprises an electrical connection between the fixture and at least one of the first acoustic wave transducer and the second acoustic wave transducer, if one is used. The two transducers may thus be connected to the same antenna.

Implantable intravascular pressure sensors may have a maximum rigid length of less than 12 mm, for example less than 10 mm, for example less than 8 mm. They may be at least 4 mm long. As to width, they may be less than 2 mm wide, for example less than 1.5 mm. They may be at least 0.4 mm wide.

The elongate compliant member of the embodiments described herein, such as the piezoelectric beam of FIG. 12, may have a length of at least 4 mm, and generally less than 12 mm, for example less than 10 mm. It may be at least 0.1 mm wide, for example at least 0.2 mm, for example at least 0.8 mm. Generally its width is less than 1.5 mm, for example less than 1.3 mm. Typically it is between 0.4 mm and 1.5 mm wide. Its thickness is typically between 40 and 60 microns. The surface acoustic wave transducer may have a length of between 1.2 mm and 1.4 mm. This may provide a sensor suitable for sensing pressure changes in a range suitable for the cardiovascular system. For example sensing pressures of about 0.1 bar (e.g. between 0.08 bar and 0.3 bar), with a resolution of between 0.5 mbar and 5 mbar.

Whilst embodiments described herein have generally referred to the presence of a compressed fluid within an internal volume of the rigid enclosure, a vacuum may also be used. Where a vacuum is used, it is to be appreciated that the resistive forces (i.e. forces which oppose the deflection of the member) due to compression of the sealed volume may be reduced.

Embodiments described herein have generally referred to the ends of the member being rigidly fixed within the enclosure (or to a base within the enclosure). However, less rigid methods of fixation may also be used. For example, the ends may be bonded to the enclosure over a narrow track. This type of fixation may enable the regions of the beam near to the join to 'roll' about the fixation. It is to be appreciated in the context of this disclosure that the results measured by the acoustic wave device may differ depending on the type of fixation. However, it is possible to provide a calibration for these measurements so that irrespective of the exact attachment mechanism between the member and the enclosure, the external fluid pressure may be determined based on these measurements.

It is to be appreciated in the context of this disclosure that any suitable manufacturing method may be employed to manufacture the pressure sensors described herein.

Hermetic bonds described herein (e.g. between the enclosure and the membrane) may be formed in any suitable manner. In particular, a metal interlayer may be positioned between the two-surfaces to be hermetically sealed. The metal interlayer may form a diffusion bond such as a eutectic bond, in which some of the metal interlayer diffuses into the crystal lattice of the two surfaces. This may form a hermetically sealed bond in which an alloy, rather than an elemental metal, is formed at the interface. Specifically, the alloy is chosen to have a lower melting point compared to the bondline material, thus allowing a diffusion bond to be formed at a lower temperature. It will be appreciated in the context of the present disclosure that prior to bonding, a metal bond frame is formed on at least one of the substrates (e.g. on the membrane and/or the enclosure). In case both enclosure and membrane have metal bond frames, the bonding can done by thermo-compression in which case no further interlayer (between the bond frames) needs to be used. In some possibilities a further interlayer can be used. This may comprise a metal of lower melting point that can form alloy with the bond frames. The adhesion of the bond frames to the substrates is usually enhanced by an adhesion layer (of different metal) that is deposited directly on the substrates before deposition of the bond frames.

Alloys suitable for such bonding may include a base material and a dopant. They may comprise, for example, a gold base material and a dopant. Base materials should have a good diffusivity in crystalline materials such as quartz and silicon. Gold is an example of a suitable base material as it can diffuse into silicon to form a eutectic mixture. In some embodiments an adhesion layer comprising a material such as titanium or chromium may be applied between the crystalline material and the bond. This may be of particular utility where the crystalline material comprises quartz and the base material comprises gold. Suitable dopants contribute to the lowering of the melting temperature of the composition. Indium and tin are suitable examples of dopants for lowering the melting point of the eutectic composition. In particular, dopant levels of at least 15% by mass, at least 20% by mass, or even at least 25% by mass are suitable. Specifically, a doping level of 20% tin in gold, or a doping level of 27% indium in gold are suitable for the present application.

This bonding method may enable the bonding of a metallic diaphragm (e.g. the membrane) to be bonded to a ceramic body of the enclosure. Such a bond may enable an efficient transfer of pressure load to the compliant member through the membrane (e.g. in combination with the corrugation of the membrane) with minimal mechanical counter force while allowing for a long term hermetical seal.

Another method of manufacture may include assembling the member and the enclosure before providing the two into a polymeric tube. Methods of vapour or atomic layer deposition, ALD, may be used, wherein the polymer tube is coated with organic and inorganic layers. For example, silicon and glassy oxides may be used. By layering two such materials, it may be possible to provide a hermetic seal, which provides for long term hermeticity.

Another method of manufacture may comprise electroforming the rigid enclosure on a sacrificial mandrel. The electroforming may be performed to provide a large area of one side, which comprises the corrugation, to be significantly thinner than the rest of the body. This side may form the flexible membrane. In such an arrangement, antenna poles may be embedded into a biocompatible dielectric (e.g. glass, ceramic) to form a feed through which is inserted into the ends of the rigid enclosure. The rigid enclosure may then be bonded hermetically to these dielectric caps, with antenna poles electrically connected to the sides of these bond lines at the end of the enclosure.

It is to be appreciated in the context of the present disclosure that a cardiovascular pressure sensor refers to a sensor suitable for implantation in a cardiovascular system. For example, this may involve implantation in to a region of the body arranged for transportation/circulation of the blood (or other suitable fluids). For example, this may include the cardiovascular system such as the arteries, veins, and coronary vessels, portal veins, and chambers of the heart.

It may also be possible to provide sensors for implantation into capillaries, the lungs, or kidneys. Implantation may also be into a region of the lymphatic system.

Whilst the device has been described as a cardiovascular pressure sensor, it is to be appreciated that this is not the only use for the device. For example, the device may be implanted into other regions or passages of a human body. For example, the device may be inserted into a suitable duct or via, such as could be found in e.g. the gallbladder, ear canal. In such contexts, it is to be appreciated that fluid pressure may comprise pressure from substances (or types of substance) in addition to, or as an alternative to, fluids.

It is to be appreciated in the context of the present disclosure that where attachments or fixings between components has been described as rigid, this may not be necessary. For example, instead of providing a rigid fixing, a simple support may be used.

It is to be appreciated in the context of the present disclosure that where a use of compressible fluids has been described, this may not be essential. For example, a vacuum could be used. Also, for example, a fluid may be incompressible and this incompressible fluid may move into a separate region or mechanism which is capable of absorbing this displacement of fluid.

It is to be appreciated in the context of the present disclosure that piezoelectric materials as described herein may comprise any suitable material which exhibits piezoelectric properties for use in the present pressure sensor. Examples of such materials may include naturally occurring crystals or materials, as well as synthetic crystals or ceramics (including lead free ceramics), organic nanostructures, polymers and group III-V and II-VI semiconductors.

It is to be appreciated in the context of the present disclosure that reference to internal faces or sides, as well as terms such as underside, may be used to describe a region of the pressure sensor which is sheltered from the external fluid pressure load. The specific arrangement of internality may not be essential.

The embodiments shown in the Figures are merely exemplary, and include features which may be generalised, removed or replaced as described herein and as set out in the claims. For example, the structure of the layers may be a simplification, and additional materials or layers may be provided. For example, the acoustic wave devices may be isolated from the compressed fluid in the internal volume through the provision of an additional layer which seals them. Such additional sealing layers may be provided for other components as well. The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention.

Other examples and variations of the disclosure will be apparent to the skilled addressee in the context of the present disclosure.

What is claimed is:

1. An implantable cardiovascular pressure sensor comprising:
 a rigid enclosure sealed by a flexible membrane; and
 an elongate compliant member comprising a piezoelectric material, the member having a width and a length greater than the width, and two ends separated by the length and two sides separated by the width, the elongate compliant member further comprising a top face and a bottom face, the bottom face facing into a cavity of the rigid enclosure;
 wherein the flexible membrane is coupled to the elongate compliant member to transfer external fluid pressure load to the elongate compliant member to cause deflection of the elongate compliant member in response to changes in the external fluid pressure;
 the pressure sensor further comprising:
 a first surface acoustic wave device disposed on the bottom face of the elongate compliant member, for sensing said deflection,
 wherein the two ends of the elongate compliant member are supported on or rigidly fixed to the rigid enclosure and the two sides are not rigidly connected to the rigid enclosure to provide that deflection of the elongate compliant member is a beam deflection.

2. The sensor of claim 1 wherein the SAW device comprises an interdigitated transducer having a plurality of interdigitated fingers spaced apart in a direction of the length of the compliant member.

3. The sensor of claim 1, wherein the sensor comprises a base in the rigid enclosure.

4. The sensor of claim 1, wherein the rigid enclosure comprises a piezoelectric material and the sensor comprises a second surface acoustic wave device.

5. The sensor of claim 4 wherein the second surface acoustic wave device is disposed on at least one of: an internal surface of the rigid enclosure; and a base in the rigid enclosure.

6. The sensor of claim 4 wherein the elongate compliant member and a substrate of the second surface acoustic wave device comprise the same piezoelectric material;
 wherein the rigid enclosure provides a base;
 wherein the flexible membrane comprises a strain corrugated diaphragm;
 wherein the diaphragm comprises at least one ridge or groove;
 wherein the diaphragm comprises a corrugated region of the flexible membrane;
 wherein the membrane comprises at least one of:
 a biocompatible metal; and
 a layered polymer structure;
 a layer of polymer and a layer of a sealing material;
 a layer of polymer and a layer of a sealing material comprising a plurality of layers of the polymer and/or the sealing material provided in alternate layers of the membrane;
 a layer of polymer and a layer of a sealing material wherein the sealing material comprises an inorganic or glassy oxide; and
 a layered polymer structure wherein the layers are provided by atomic or vapour layer deposition.

7. The sensor of claim 1 wherein the two ends are rigidly fixed or simply supported within the enclosure.

8. The sensor of claim 1 wherein the wall and the compliant region are integrally formed from a same material; and wherein the wall and the compliant region comprise a biocompatible metal.

9. The sensor of claim 1 comprising a second surface acoustic wave device, arranged to provide a reference for the first surface acoustic wave device.

10. The sensor of claim 9, wherein being arranged to provide a reference comprises at least one of:
 the second surface acoustic wave device being disposed on a piezoelectric substrate that is arranged to be deflected differently in response to a pressure difference than a substrate of the first surface acoustic wave device;
 said piezoelectric substrate being arranged so that the piezoelectric substrate is deflected less by displacement of the compliant region than the substrate of the first surface acoustic wave device; and
 the second surface acoustic wave device being provided on the same substrate as the first surface acoustic wave device.

11. The sensor of claim 1 wherein the elongate compliant member is supported at least one end, and has a length cantilevered from said support that is more than its width.

12. The sensor of claim 11 wherein the elongate compliant member is a beam.

13. The sensor of claim 1 wherein the enclosure comprises a deposited body, formed by deposition on a mandrel to provide the wall and compliant region;

wherein the wall provides at least one side of the enclosure;

wherein the enclosure is closed by a dielectric end cap hermetically sealed to an end of the enclosure; and wherein the dielectric end cap comprises a fixture for holding an antenna, wherein the sensor comprises an electrical connection between the fixture and the first surface acoustic wave device.

14. An implantable cardiovascular pressure sensor comprising:

a rigid enclosure sealed by a flexible membrane; and an elongate compliant member comprising a piezoelectric material, the member having a width and a length greater than the width, and two ends separated by the length and two sides separated by the width;

wherein the flexible membrane is coupled to the elongate compliant member to transfer external fluid pressure load to the elongate compliant member to cause deflection of the elongate compliant member in response to changes in the external fluid pressure;

the pressure sensor further comprising:

a first acoustic wave device provided by the piezoelectric material of the elongate compliant member for sensing said deflection, wherein the deflection of the elongate compliant member comprises a beam deflection, wherein the flexible membrane comprises a strain relief, wherein the two sides of the elongate compliant member are not supported on and not rigidly fixed to the rigid enclosure, and wherein the two sides of the elongate compliant member are connected to the rigid enclosure by the strain relief.

15. The sensor of claim 14, wherein the strain relief comprises a corrugated diaphragm.

16. The sensor of claim 15 wherein the diaphragm comprises at least one ridge or groove.

17. The sensor of claim 16 wherein the diaphragm comprises a corrugated region of the flexible membrane.

* * * * *